US010749393B2

(12) United States Patent
Takano et al.

(10) Patent No.: US 10,749,393 B2
(45) Date of Patent: Aug. 18, 2020

(54) ROTOR, ROTARY ELECTRIC MACHINE, AND MANUFACTURING METHOD OF ROTOR

(71) Applicant: FANUC CORPORATION, Yamanashi (JP)

(72) Inventors: Shinobu Takano, Yamanashi (JP); Takafumi Kajiya, Yamanashi (JP); Kaname Matsumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 171 days.

(21) Appl. No.: 15/993,692

(22) Filed: May 31, 2018

(65) Prior Publication Data

US 2019/0036401 A1   Jan. 31, 2019

(30) Foreign Application Priority Data

Jul. 26, 2017   (JP) .................................. 2017-144562

(51) Int. Cl.
*H02K 1/27* (2006.01)
*H02K 1/28* (2006.01)
(Continued)

(52) U.S. Cl.
CPC ................. *H02K 1/28* (2013.01); *H02K 1/20* (2013.01); *H02K 1/278* (2013.01); *H02K 15/03* (2013.01); *H02K 5/20* (2013.01); *H02K 2213/03* (2013.01)

(58) Field of Classification Search
CPC .......... H02K 1/27–1/2793; H02K 1/28; H02K 1/30; H02K 1/278
(Continued)

(56) References Cited

U.S. PATENT DOCUMENTS 5,170,085 A * 12/1992 Shinto .................... H02K 1/278
310/156.28
5,486,730 A *  1/1996 Ludwig .................. H02K 1/278
156/293
(Continued)

FOREIGN PATENT DOCUMENTS

JP          H04109837 A      4/1992
JP          H08-107641 A     4/1996
(Continued)

OTHER PUBLICATIONS

Machine Translation, Horizumi, JP-2013038858-A, Feb. 2013. (Year: 2013).*
(Continued)

*Primary Examiner* — Thomas Truong
(74) *Attorney, Agent, or Firm* — Studebaker & Brackett PC

(57) ABSTRACT

A rotor includes a rotary member, a plurality of permanent magnets disposed on an outer circumference of the rotary member, and a cover tube that is mounted to outer circumference of the permanent magnets to cover the permanent magnets, and is formed of a fiber reinforced plastic. At least one of the rotary member and the permanent magnets has a diameter enlarged portion having a diameter enlarged circumferential surface. The diameter enlarged portion has a diameter that enlarges from a first diameter region to a second diameter region. The first diameter region has a diameter equal to or less than an inner diameter of the cover tube. The second diameter region has a diameter equal to or more than an outer diameter of the permanent magnets.

8 Claims, 17 Drawing Sheets

(51) Int. Cl.
*H02K 15/03* (2006.01)
*H02K 1/20* (2006.01)
*H02K 5/20* (2006.01)

(58) Field of Classification Search
USPC ............ 310/156.01, 156.12, 156.28, 156.31
See application file for complete search history.

(56) References Cited

U.S. PATENT DOCUMENTS

| 2009/0102304 | A1* | 4/2009 | Yamamura | ............. | H02K 1/278 |
| | | | | | 310/156.28 |
| 2014/0300233 | A1* | 10/2014 | Arimatsu | ............... | H02K 1/278 |
| | | | | | 310/156.12 |

FOREIGN PATENT DOCUMENTS

| JP | H8-265997 | A | | 10/1996 |
| JP | H09224339 | A | | 8/1997 |
| JP | H10-225032 | A | | 8/1998 |
| JP | 2001-169487 | A | | 6/2001 |
| JP | 2005-312250 | A | | 11/2005 |
| JP | 2013038858 | A | * | 2/2013 |
| JP | 2017-50925 | A | | 3/2017 |
| JP | 6168263 | B1 | | 7/2017 |

OTHER PUBLICATIONS

An Office Action; "Notice of Reasons for Refusal" issued by the Japanese Patent Office dated May 7, 2019, which corresponds to Japanese Patent Application No. 2017-144562 and is related to U.S. Appl. No. 15/993,692; with English Translation.

An Office Action mailed by the Japan Patent Office dated Oct. 8, 2019, which corresponds to Japanese Patent Application No. 2017-144562 and is related to U.S. Appl. No. 15/993,692; with English translation.

* cited by examiner

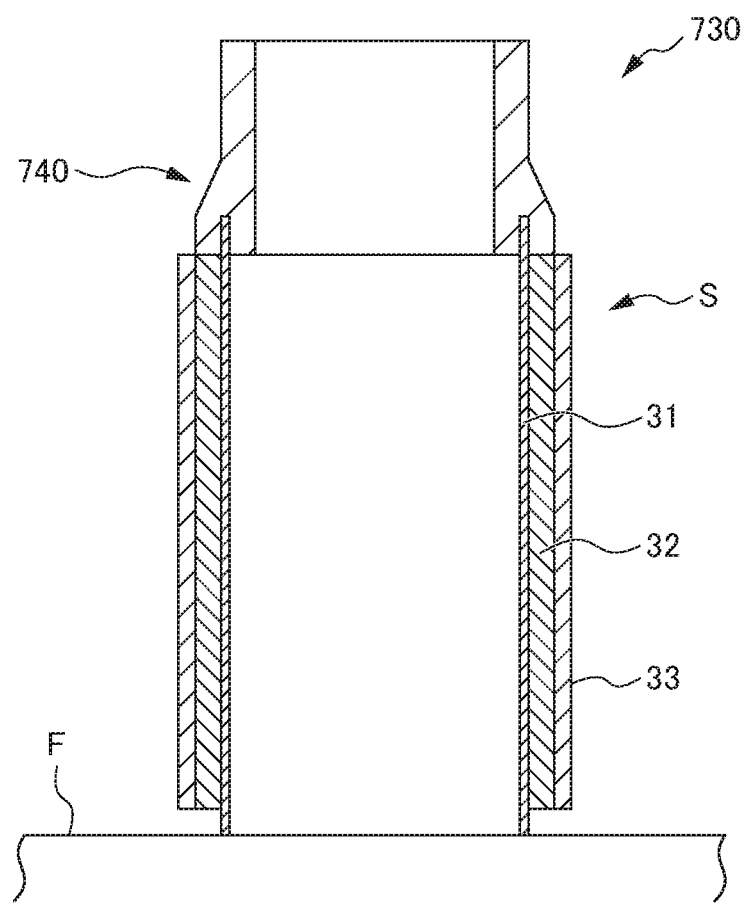

ROTOR, ROTARY ELECTRIC MACHINE, AND MANUFACTURING METHOD OF ROTOR

This application is based on and claims the benefit of priority from Japanese Patent Application No. 2017-144562, filed on Jul. 26, 2017, the content of which is incorporated herein by reference.

BACKGROUND OF THE INVENTION

Field of the Invention

The present invention relates to a rotor, a rotary electric machine including the rotor, and a manufacturing method of the rotor.

Related Art

As one type of a motor in which a permanent magnet is used in a rotor, a motor of a surface permanent magnet (SPM) type in which a permanent magnet is disposed on an outer circumference of a rotary member (a sleeve, a rotary axis, or the like) is known. In this motor of the SPM type, a cylindrical cover tube (protect tube) is mounted on an outer circumference of the rotor so that the permanent magnet is prevented from falling off from the rotor due to the centrifugal force at the time of high speed rotating. As a material of the cover tube, a fiber reinforced plastic (FRP), particularly, a carbon fiber reinforced plastic (hereinafter, also referred to as a "CFRP") is widely used, since the fiber reinforced plastic has high strength, light weight, and other reasons. Conventionally, as a technique of mounting a cover tube formed of the CFRP to an outer circumference of a rotary member in which a permanent magnet is disposed, freeze fitting is mainly used (for example, see Patent Documents 1 and 2).

Patent Document 1: Japanese Unexamined Patent Application, Publication No. H8-107641

Patent Document 2: Japanese Unexamined Patent Application, Publication No. 2005-312250

SUMMARY OF THE INVENTION

When a cover tube formed of the CFRP is mounted to an outer circumference of a rotary member in which a permanent magnet is disposed by freeze fitting, in addition to influence of ice, condensation, or the like due to temperature change, there is limitation in performance of a cooling unit. Thus, it is difficult to mount the cover tube to the permanent magnet disposed on the outer circumference of the rotary member with enough interference.

An object of the present invention is to provide a rotor in which a cover tube can be mounted to permanent magnets disposed on an outer circumference of a rotary member with larger interference, a rotary electric machine, and a manufacturing method of the rotor.

(1) The present invention relates to a rotor (for example, a rotor 30 described later) including: a rotary member (for example, a sleeve 31 described later); a plurality of permanent magnets (for example, permanent magnets 32 described later) disposed on an outer circumference of the rotary member; and a cover tube (for example, a cover tube 33 described later) that is mounted on an outer circumference of the permanent magnets to cover the permanent magnets, and is formed of a fiber reinforced plastic, wherein at least one of the rotary member (31) and the permanent magnets (32) has a diameter enlarged portion (for example, a diameter enlarged portion 40 described later) having a diameter enlarged circumferential surface (for example, a diameter enlarged circumferential surface 50 described later), the diameter enlarged portion has a diameter that enlarges from a first diameter region (for example, a first diameter region dt1 described later) to a second diameter region (for example, a second diameter region dt2 described later), the first diameter region has a diameter equal to or less than an inner diameter of the cover tube, and the second diameter region has a diameter equal to or more than an outer diameter of the permanent magnets.

(2) In the rotor of (1), the diameter enlarged portion may be provided in an at least one end portion in a rotary axis direction.

(3) in the rotor of (1), the diameter enlarged portion may be provided in both end portions in the rotary axis direction, and the cover tube may be divided along the rotary axis direction.

(4) In any of the rotors of (1) to (3), the diameter enlarged portion may be configured to be coupled with an end portion of the rotary member.

(5) In the rotor of (4), the diameter enlarged portion and the rotary member may include matching portions that match rotary centers of the diameter enlarged portion and the rotary member.

(6) In any of the rotors (1) to (5), the diameter enlarged circumferential surface of the diameter enlarged portion may be formed to be a tapered shape or a curved shape.

(7) The present invention relates to a rotary electric machine (for example, a motor 1 described later) including: any of the rotors of (1) to (6), a rotary axis (for example, a rotary axis 35 described later) that supports the rotor; and a stator (for example, a stator 20 described later) provided in an outer circumference of the rotor.

(8) The present invention relates to a manufacturing method for manufacturing a rotor including a rotary member, a plurality of permanent magnets disposed on an outer circumference of the rotary member, and a cover tube formed of a fiber reinforced plastic, wherein at least one of the rotary member and the permanent magnets has a diameter enlarged portion having a diameter enlarged circumferential surface, the diameter enlarged portion has a diameter that enlarges from a first diameter region to a second diameter region, the first diameter region has a diameter equal to or less than an inner diameter of the cover tube, and the second diameter region has a diameter equal to or more than an outer diameter of the permanent magnets, the manufacturing method comprises putting the cover tube around the outer circumference of the permanent magnets by pushing the cover tube from the first diameter region to enlarge the inner diameter of the cover tube by the second diameter region of the diameter enlarged portion.

According to the present invention, a rotor in which a cover tube can be mounted to a permanent magnet disposed on an outer circumference of a rotary member with larger interference, a rotary electric machine, and a manufacturing method of the rotor, can be provided.

BRIEF DESCRIPTION OF THE DRAWINGS

FIG. 10B is a diagram explaining the configuration and the manufacturing method of the rotor 730 of the eighth embodiment.

DETAILED DESCRIPTION OF THE INVENTION

Figure 1:
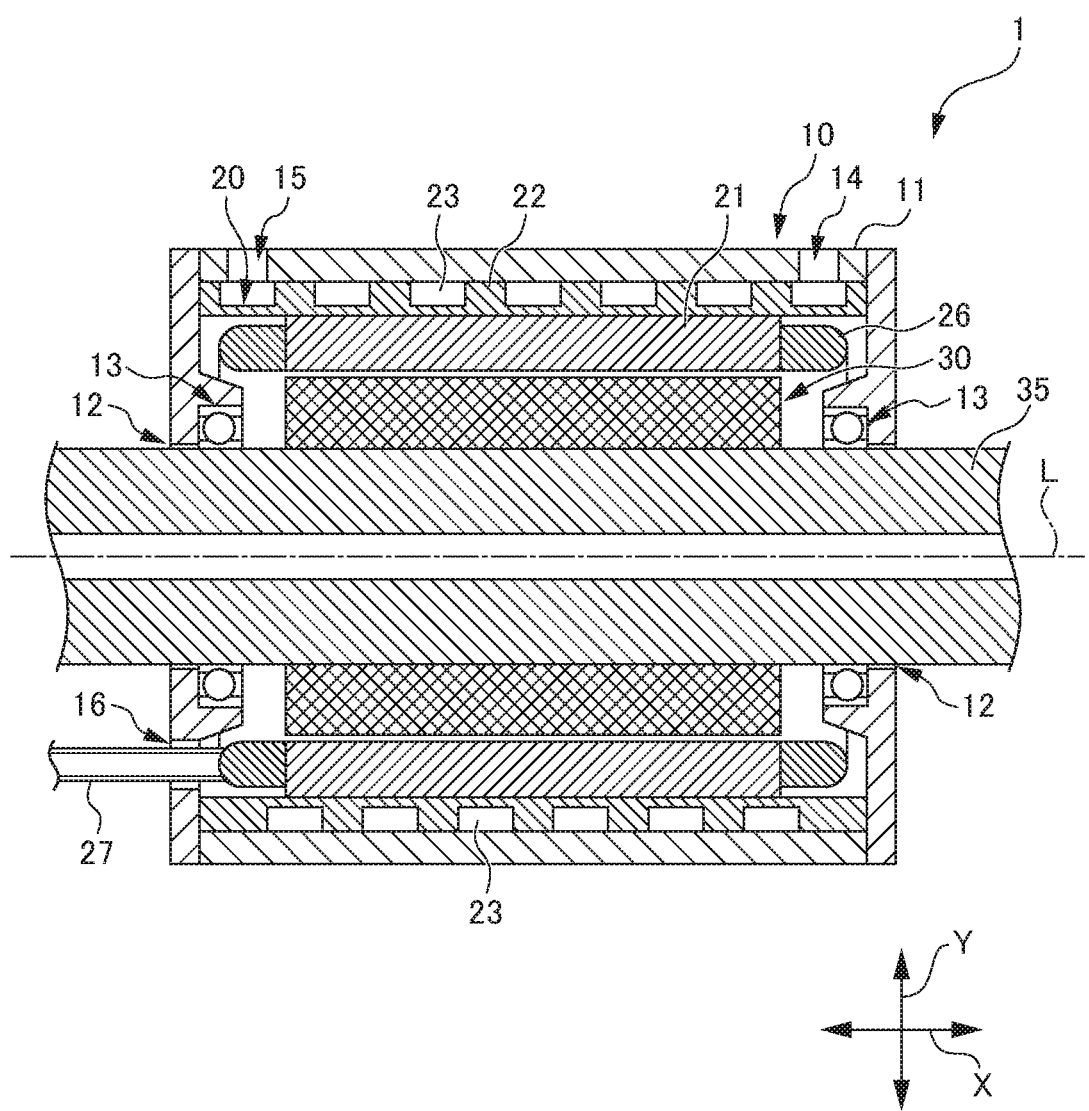
FIG. 1 is a cross sectional view showing a configuration of a motor 1 in a first embodiment.

Embodiments of the present invention will be described below. All drawings attached to this specification are schematic views, and a shape, scale, vertical and horizontal dimensional ratio, and the like of each portion are changed or exaggerated from actual ones in consideration of easiness of understanding, and the like. For example, in a drawing explaining a manufacturing method of a rotor described later, a length of a rotary axis direction of the rotor is exaggerated to be short, and the entire shape of a permanent magnet is simplified. In the drawings, hatching that shows a cross section of a member is omitted as appropriate.

In this specification, a shape, a geometrical condition, and terms specifying degrees thereof, for example, terms such as "parallel" and "direction", include, in add on to a strict meaning of the term, a range of degrees that can be considered to be almost parallel, and a range that can be considered to be generally the direction. In this specification, and the like, a line that is a rotary center of a rotary axis 35 described later is referred to as a "rotary axis line L", and a direction along the rotary axis line L is referred to as a "rotary axis direction". The "rotary axis line L" and the "rotary axis direction" are applied also to each part composing the rotor, for example, a sleeve, a diameter enlarged portion, a permanent magnet, and a sleeve laminate described later.

First Embodiment

First, a motor 1 serving as a rotary electric machine including a rotor 30 of a first embodiment will be described. A configuration of the motor 1 is common with other embodiments described later. FIG. 1 is a cross sectional view showing a configuration of the motor 1 in the first embodiment. A configuration of the motor 1 shown in FIG. 1 is an example, and, the motor 1 may have any configuration in which the rotor 30 of the first embodiment can be applied.

As shown in FIG. 1, the motor 1 includes a frame 10, a stator 20, a rotor 30, a rotary axis 35, and a bearing 13 as main constituent features. The frame 10 is an exterior member of the motor 1, and includes a frame body 11 and an axis hole 12. The frame body 11 is a casing that encloses and holds the stator 20. The frame body 11 holds the rotor 30 via the bearing 13. The frame body 11 includes a supply port 14, a discharge port 15, and a hole portion 16. The supply port 14 is an opening for supplying refrigerant to a flow path 23 of a stator frame 22, and is connected to a supply piping (not shown) of the refrigerant. The discharge port 15 is an opening for discharging the refrigerant flowing through the flow path 23, and is connected to a discharge piping (not shown) of the refrigerant. The hole portion 16 is an opening through which a power line 27 drawn from the stator 20 passes.

The axis hole 12 is a hole through which a rotary axis 35 (described later) passes. The stator 20 is a composite member forming a rotary magnetic field for rotating the rotor 30. The stator 20 is entirely formed to be a cylindrical shape, and is fixed to an inside of the frame 10. The stator 20 includes an iron core 21, and the stator frame 22.

The iron core 21 is a member in which a winding 26 can be disposed in an inside. The iron core 21 is formed to be a cylindrical shape, and is disposed in an inside of the stator frame 22. A plurality of grooves (not shown) are formed in an inside surface of the iron core 21, and the winding 26 is disposed in these grooves. Part of the winding 26 projects from both end portions of the iron core 21 in an axis direction of the iron core 21. For example, the iron core 21 is manufactured by obtaining a laminate by laminating a plurality of thin plates such as an electromagnetic steel plate, and integrating the laminate by bonding, caulking, or the like.

The stator frame 22 is a member that holds the iron core 21 in an inside of the stator frame 22. The stator frame 22 is formed to be a cylindrical shape, and is disposed in an outside of the stator 20. The iron core 21 is strongly joined to the stator frame 22 for receiving a reaction force generated by a torque of the rotor 30. As shown in FIG. 1, the stator frame 22 of the present embodiment includes the flow path 23 for cooling heat transmitted from the iron core 21, in an outside surface of the stator frame 22. The flow path 23 is a single or multi spiral groove formed in the outside surface of the stator frame 22. The refrigerant (not shown) supplied from the supply port 14 of the frame body 11 (the frame 10) flows through the flow path 23 so as to be spirally along the outside surface of the stator frame 22, and then, is discharged from the discharge port 15 of the frame body 11 to the outside.

The power line 27 electrically connected with the winding 26 is drawn from the iron core 21 of the stator 20. The power line 27 is connected to a power supply device installed in an outside of the motor 1 (not shown). In operation of the motor 1, for example, a rotary magnetic field for rotating the rotor 30 is formed by supplying a three-phase alternating current to the iron core 21.

The rotor 30 is a part that rotates by magnetic interaction with the rotary magnetic field formed by the stator 20. The rotor 30 is provided in an inner circumferential side of the stator 20. A configuration of the rotor 30 will be described later.

The rotary axis 35 is a member that supports the rotor 30. The rotary axis 35 is inserted so as to pass through the axis center of the rotor 30, and is fixed to the rotor 30. A pair or bearings 13 is to the rotary axis 35. The bearings 13 are members that rotatably support the rotary axis 35, and are provided in the frame body 11. The rotary axis 35 is rotatably supported around a rotary axis line L by the frame body 11 and the bearings 13. The rotary axis 35 passes through the axis hole 12, and, for example, is connected to a tool chuck of a cutting tool, a power transmission mechanism installed in the outside, a deceleration mechanism, or the like (all of them are not shown).

In the motor 1 shown in FIG. 1, when a three-phase alternating current is supplied to the stator 20 (the iron core 21), a rotary force is generated in the rotor 30 by magnetic interaction between the stator 20 and the rotor 30 in which a rotary magnetic field is formed, and the rotary force is output to the outside via the rotary axis 35. In the present embodiment, as the motor 1, a synchronous motor of the SPM type described above is described. However, for example, the motor 1 may be a synchronous motor of an interior permanent magnet (IPM) type.

Figure 2:
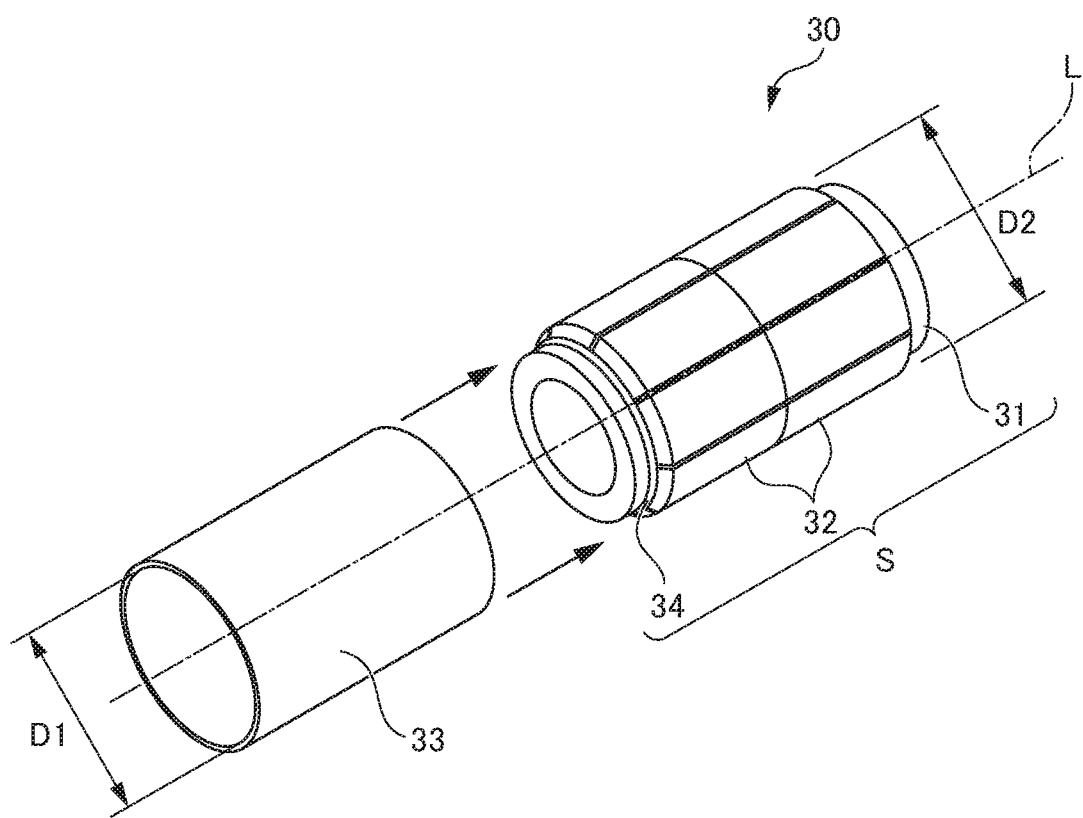
FIG. 2 is an exploded perspective view of a rotor 30.

Next, a configuration of the rotor 30 will be described. FIG. 2 is an exploded perspective view of the rotor 30. As shown in FIG. 2, the rotor 30 includes a sleeve (rotary member) 31, permanent magnets 32, and a cover tube 33. The sleeve 31 is a substantially cylindrical member to which the plurality of permanent magnets 32 are attached, and is provided in between the rotary axis 35 (see FIG. 1) and the plurality of permanent magnets 32. The plurality of permanent magnets 32 are disposed along a circumferential direction of the sleeve 31. The sleeve 31 is formed of, for example, a magnetic material such as a carbon steel. The rotor 30 having the sleeve 31 in an inner circumferential side is fit to the outer circumference of the rotary axis 35 by interference fit.

The permanent magnets 32 are members that generate a magnetic field, and are provided in eight rows along the circumferential direction in the outer circumference of the sleeve 31 as shown in FIG. 2 (only four rows in a front side are illustrated in FIG. 2). For the eight rows of the permanent magnets 32, the permanent magnets 32 for an N pole and the permanent magnets 32 for an S pole are alternately disposed in the circumferential direction of the sleeve 31. The permanent magnets 32 are adhered to the outer circumferential surface of the sleeve 31 via an adhesive layer 34. In the present embodiment, an example in which the permanent magnets 32 in each row are divided into two along a longitudinal direction (X direction) of the rotor 30 is described. However, the permanent magnets 32 are not limited thereto, and may be divided into three or more along the longitudinal direction of the rotor 30, or may not be divided. In FIG. 2, illustration of a diameter enlarged portion (described later) that is a characteristic configuration of the permanent magnets 32 in the present embodiment, is omitted.

The cover tube 33 is a cylindrical member for covering the plurality of permanent magnets 32. The cover tube 33 is mounted to an outer circumferential surface of the permanent magnet 32 disposed in the sleeve 31. The permanent magnets 32 can be prevented from failing off from the rotor 30 due to the centrifugal force generated by rotation of the rotor 30 by mounting the cover tube 33 to the outer circumferential surfaces of the permanent magnets 32. In the present embodiment, as described later, an example in which the cover tube 33 is directly mounted to the outer circumferential surface of the permanent magnet 32 is described. However, the cover tube 33 may be mounted to the outer circumferential surface of the permanent magnet 32, for example, via an adhesive layer, or the like.

The cover tube 33 can be shaped by, for example, winding a fiber sheet for the CFRP to a tubular jig, together with a resin. As a material forming the cover tube 33, other than the CFRP, for example, a fiber reinforced plastic including a material having a high specific strength, such as a glass fiber, an aramid fiber, a silicon carbide fiber, a boron fiber, a titanium alloy fiber, or the like can be used.

As described later, the cover tube 33 is inserted to the rotor 30, in a state where a diameter of the cover tube 33 is enlarged to a predetermined inner diameter, and is mounted to the rotor 30 by a contraction force in accordance with interference. Thereby, a reaction force that is enough to hold the permanent magnets 32 is applied toward the inside of a radial direction of the cover tube 33, resisting the centrifugal force generated when the rotor 30 rotates. In this way, the reaction force is applied toward the inside of the radial direction in the cover tube 33, and thereby, the permanent magnets 32 are prevented from falling off from the rotor 30 by the centrifugal force. The inside of the radial direction refers to a direction of approaching the rotary axis line L from the outside of the rotor 30.

As shown in FIG. 2, the interference is a dimension of a difference (D2-D1) of an outer diameter D2 of the permanent magnets 32 disposed in the sleeve 31, with respect to an inner diameter D1 of the cover tube 33 of before the diameter is enlarged (before being mounted). As the interference is larger, although mounting of the cover tube 33 to the outer circumferential surfaces of the permanent magnets 32 is more difficult, larger reaction force can be applied toward the inside of the radial direction from the mounted cover tube 33.

Figure 3A:
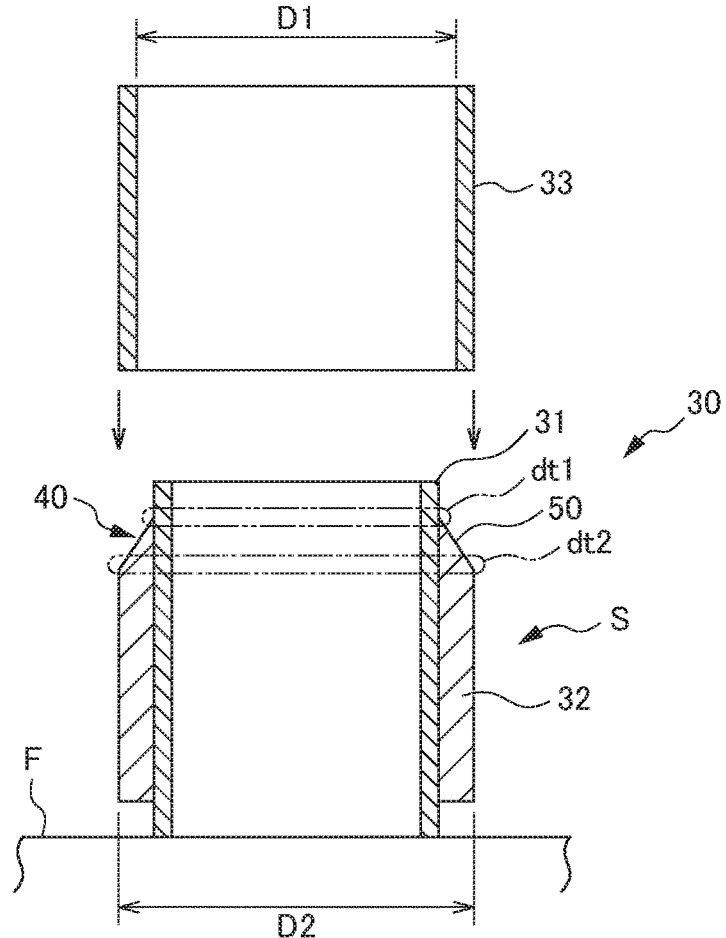
FIG. 3A is a diagram explaining a configuration and a manufacturing method of the rotor 30 of the first embodiment.
Figure 3B:
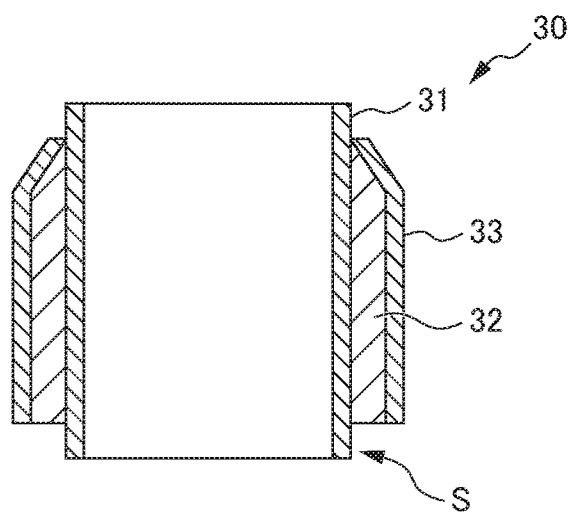
FIG. 3B is a diagram showing the rotor 30 of the first embodiment.

Next, the configuration of the rotor 30 in the first embodiment will be described. FIG. 3A is a diagram explaining a configuration and a manufacturing method of the rotor 30 of the first embodiment. FIG. 3B is a diagram showing the rotor 30 of the first embodiment. FIG. 3A and FIG. 3B show a cross section along the rotary axis line L (see FIG. 1 and FIG. 2) of the rotor 30. In FIG. 3A and FIG. 3B, for example, illustration of the adhesive layer 34, and the like is omitted (this is similar in drawings of other embodiments).

As shown in FIG. 3A, in the rotor 30 of the first embodiment, the diameter enlarged portion 40 is provided in one end portion of the rotary axis direction of the permanent magnet 32. The diameter enlarged portion 40 has a diameter enlarged circumferential surface 50 in which a diameter is enlarged from a first diameter region dt1 that is the inner diameter D1 of the cover tube 33 of before the diameter is enlarged (before being mounted) or smaller, to a second diameter region dt2 that is the outer diameter D2 of the permanent magnets 32 or larger. The diameter enlarged portion 40 is provided along the circumferential direction in one end portion of the rotary axis direction of the permanent magnet 32. The diameter enlarged circumferential surface 50 of the present embodiment is formed to be a tapered shape in which the diameter is enlarged from the first diameter region dt1 to the second diameter region dt2 in a certain inclination ratio (this is common in diameter enlarged portions of other embodiments). In the description below, the sleeve 31 to which the plurality of permanent magnets 32 are adhered to the outer circumference is also collectively referred to as a "sleeve laminate S".

In the present embodiment, as shown in FIG. 3A, in a work of mounting the cover tube 33 to the sleeve laminate S, an end portion of a side in which the diameter enlarged portion 40 is not provided in the sleeve laminate S is placed on a work surface F. In the sleeve laminate S, the cover tube 33 is inserted to the sleeve laminate S from the side in which the diameter enlarged portion 40 is provided, while pressure is applied by a press fitting device (not shown). Thereby, the diameter of the inserted cover tube 33 is gradually enlarged from the first diameter region dt1 to the second diameter region dt2 by the diameter enlarged portion 40 (the diameter enlarged circumferential surface 50) of the permanent magnet 32, and is inserted to the outer circumferential surface of the sleeve laminate S (the permanent magnet 32) as shown in FIG. 3B. The cover tube 33 inserted to the sleeve laminate S is mounted to the sleeve laminate S by interference fit by the action of the contraction force in accordance with the interference.

With the rotor 30 of the first embodiment, the cover tube 33 can be mounted to the permanent magnet 32 disposed on the outer circumference of the sleeve 31, with larger interference. Thereby, the permanent magnet 32 can be held with larger reaction force, resisting the centrifugal force generated at the time of rotating. Thus, falling off of the permanent magnet 32 due to the centrifugal force can be effectively prevented. The effect described above is common in the embodiments described later.

Second Embodiment

Figure 4A:
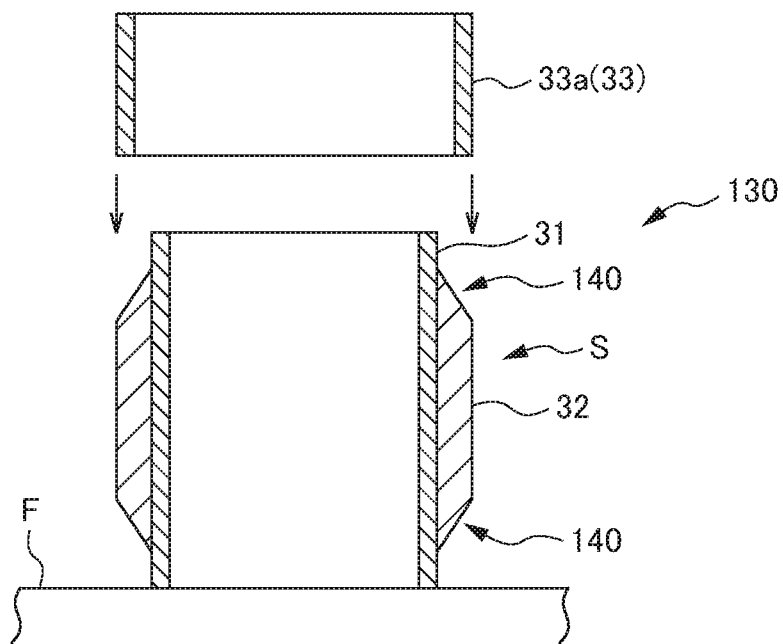
FIG. 4A is a diagram explaining a configuration and a manufacturing method of a rotor 130 of a second embodiment.
Figure 4B:
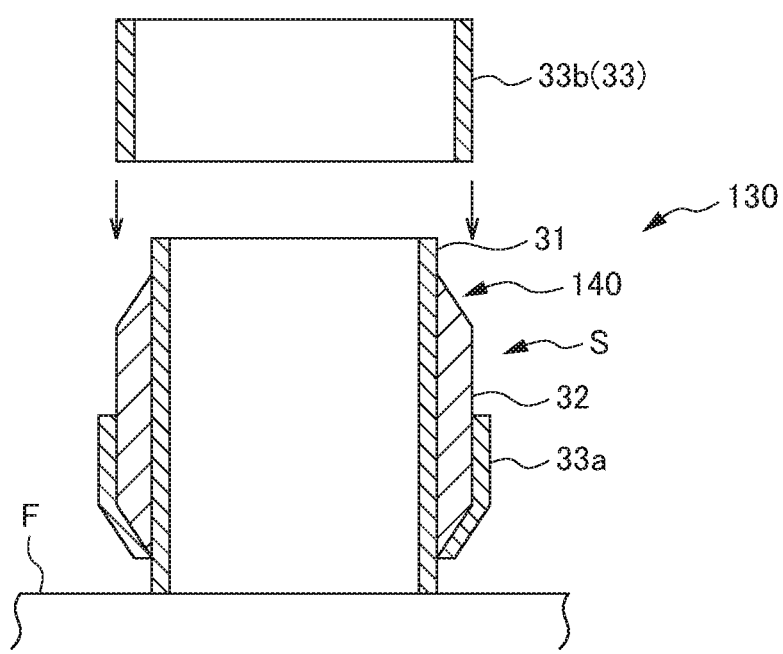
FIG. 4B is a diagram explaining the configuration and the manufacturing method of the rotor 130 of the second embodiment.
Figure 4C:
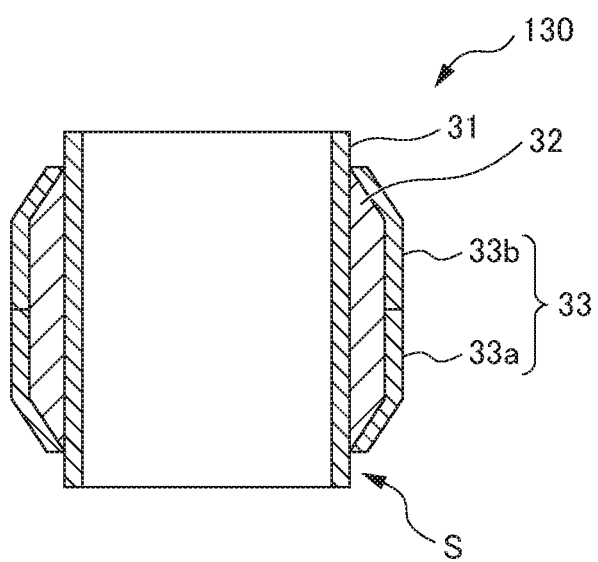
FIG. 4C is a diagram showing the rotor 130 of the second embodiment.

FIG. 4A and FIG 4B are diagrams explaining a configuration and a manufacturing method of a rotor 130 of a second embodiment. FIG. 4C is a diagram showing the rotor 130 of the second embodiment. FIG. 4A to FIG. 4C show a cross section along the rotary axis line L (see FIG. 1 and FIG. 2) of the rotor 130.

The rotor 130 of the second embodiment is different from the first embodiment in the configuration of the diameter enlarged portion and the cover tube. Other configurations of the second embodiment are the same as those of the first embodiment. Thus, in description and drawings of the second embodiment, the same numeral as the first embodiment or the same end numeral (last two digits) are added to the same member, and the like as those of the first embodiment, and description of configuration, action, and the like is omitted as appropriate.

As shown in FIG. 4A, in the rotor 130 of the second embodiment, diameter enlarged portions 140 are provided in both end portions of the rotary axis direction of the permanent magnet 32. The cover tube 33 of the second embodiment is composed of a first cover tube 33a and a second cover tube 33b. The first cover tube 33a and the second cover tube 33b are obtained by dividing the cover tube 33 into two, in a middle of the rotary axis direction.

In the present embodiment, in the work of mounting the cover tube 33 to the sleeve laminate S, as shown in FIG. 4A, any one end portion of the sleeve laminate S is placed on the work surface F. Then, the first cover tube 33a is inserted to the sleeve laminate S from the upper side of the sleeve laminate S while pressure is applied by a press fitting device (not shown). Thereby, the diameter of the inserted first cover tube 33a is enlarged by the diameter enlarged portion 140 of the permanent magnet 32, and is inserted to the outer circumferential surface of an upper half of the sleeve laminate S (the permanent magnet 32). The first cover tube 33a is mounted to a lower side portion of the sleeve laminate S by interference fit by the action of the contraction force in accordance with the interference.

Subsequently, upper and lower directions of the sleeve laminate S are switched with each other, and the sleeve laminate S is placed on the work surface F so that the first cover tube 33a is in the lower side, as shown in FIG. 4B. Then, the second cover tube 33b is inserted to the sleeve laminate S from the upper side of the sleeve laminate S, while pressure is applied by the press fitting device. Thereby, the diameter of the inserted second cover tube 33b is enlarged by the diameter enlarged portion 140 of the permanent magnet 32, and the second cover tube 33b is inserted to the outer circumferential surface of the upper half of the sleeve laminate S as shown in FIG. 4C. The second cover tube 33b is mounted to the upper side portion of the sleeve laminate S by interference fit by the action of the contraction force in accordance with the interference. In this way, in the rotor 130 of the second embodiment, the first cover tube 33a and the second cover tube 33b are sequentially mounted, and thereby, the cover tube 33 is integrated.

In the rotor 130 of the second embodiment, the cover tube 33 is divided into two. Thus, as compared to when the one cover tube 33 is inserted to the sleeve laminate S as the first embodiment, resistance of when each cover tube (33a, 33b) is inserted to the sleeve laminate S can be reduced. Accordingly, the interference of the cover tube 33 is increased, and thereby, even when the resistance of when the cover tube 33 is inserted becomes large, failure that is deformation, or the like generated in the sleeve laminate S, due to the resistance of when the cover tube 33 is inserted, can be prevented. In the second embodiment, an example in which the cover tube 33 is divided into two is described. However, the cover tube 33 may be divided into three or more.

Three Embodiment

Figure 5A:
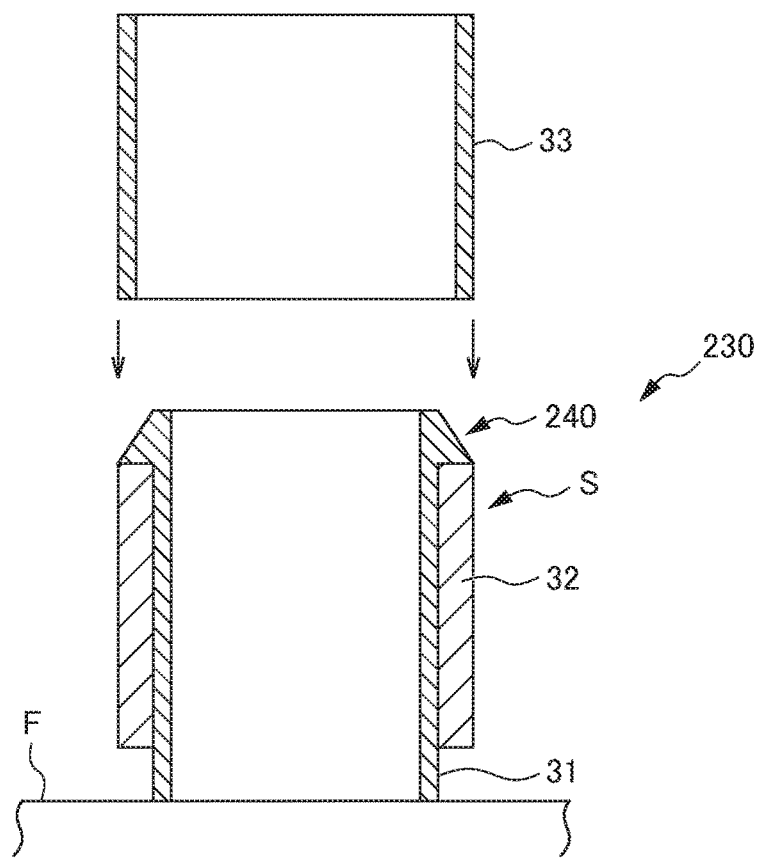
FIG. 5A is a diagram explaining a configuration and a manufacturing method of a rotor 230 of a third embodiment.
Figure 5B:
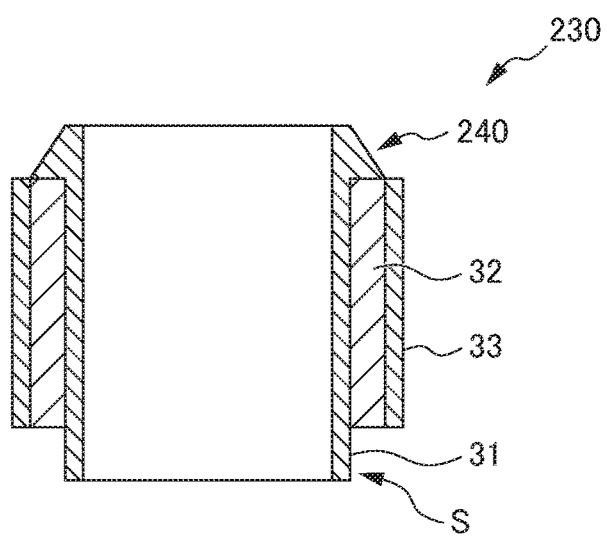
FIG. 5B is a diagram showing the rotor 230 of the third embodiment.

FIG. 5A is a diagram explaining a configuration and a manufacturing method of a rotor 230 of a third embodiment. FIG. 5B is a diagram showing the rotor 230 of the third embodiment. FIG. 5A and FIG. 5B show a cross section along the rotary axis line L (see FIG. 1 and FIG. 2) of the rotor 230.

The rotor 230 of the third embodiment is different from the first embodiment in a feature that the diameter enlarged portion is provided in the sleeve. Other configurations of the third embodiment are the same as those of the first embodiment. Thus, in description and drawings of the third embodiment, the same numerals or the same end numerals (last two digits) are added to the same member, and the like as those of the first embodiment, and description of configuration, action, and the like is omitted as appropriate.

As shown in FIG. 5A, in the rotor 230 (the sleeve laminate S) of the third embodiment, the diameter enlarged portion 240 is provided in one end portion of the rotary axis direction of the sleeve 31. The configuration of the diameter enlarged portion 240 is substantially the same as that of the diameter enlarged portion 40 of the first embodiment. The diameter enlarged portion 240 is formed integrally with the sleeve 31, and is provided along the circumferential direction in one end portion of the rotary axis direction of the sleeve 31. A diameter enlarged side of the diameter enlarged portion 240 and the outer circumferential surface of the permanent magnet 32 are substantially flush with each other.

In the present embodiment, in the work of mounting the cover tube 33 to the sleeve laminate S, as shown in FIG. 5A, the end portion of a side in which the diameter enlarged portion 240 is not provided, in the sleeve laminate S is placed on the work surface F. Then, in the sleeve laminate S, the cover tube 33 is inserted to the sleeve laminate S from the side in which the diameter enlarged portion 240 is provided, while pressure is applied by the press fitting device. Thereby, the diameter of the inserted cover tube 33 is enlarged by the diameter enlarged portion 240 of the sleeve 31, and the cover tube 33 is inserted to the outer circumferential surface of the sleeve laminate S (the permanent magnet 32) as shown in FIG. 5B. The cover tube 33 inserted to the sleeve laminate S is mounted to the sleeve laminate S by interference fit by the action of the contraction force in accordance with the interference. With the rotor 230 of the third embodiment, the diameter enlarged portion 240 is provided in the sleeve 31, and thereby, positional deviation of the permanent magnet 32 of when the cover tube 33 is inserted to the sleeve laminate can be prevented.

Fourth Embodiment

Figure 6A:
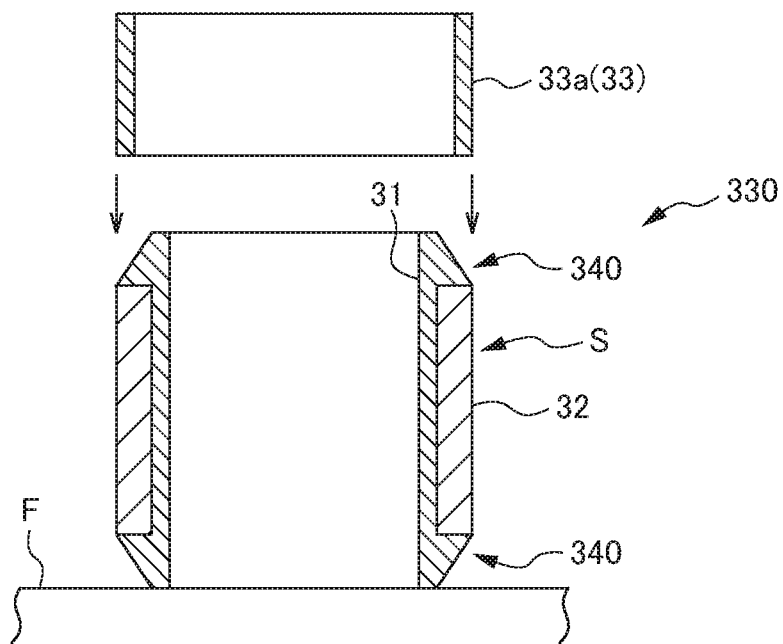
FIG. 6A is a diagram explaining a configuration and a manufacturing method of a rotor 330 of a fourth embodiment.
Figure 6B:
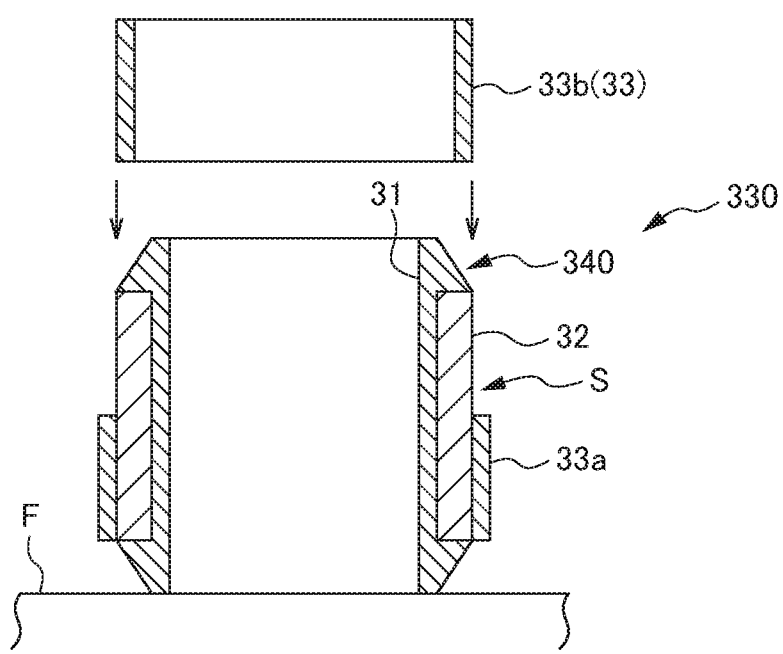
FIG. 6B is a diagram explaining the configuration and the manufacturing method of the rotor 330 of the fourth embodiment.
Figure 6C:
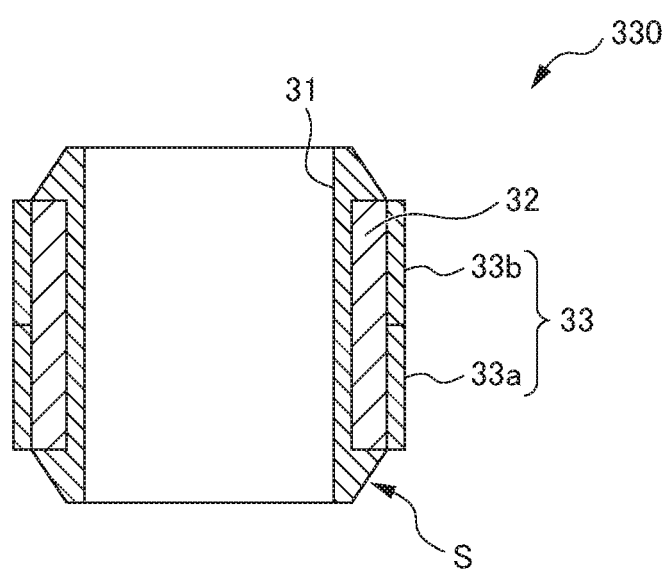
FIG. 6C is a diagram showing the rotor 330 of the fourth embodiment.

FIG. 6A and FIG. 6B are diagrams explaining a configuration and a manufacturing method of a rotor 330 of a fourth embodiment. FIG. 6C is a diagram showing the rotor 330 of the fourth embodiment. FIG. 6A to FIG. 6C show a cross section along the rotary axis line L (see FIG. 1 and FIG. 2) of the rotor 330.

The rotor 330 of the fourth embodiment is different from the third embodiment in the configurations of the diameter enlarged portion and the cover tube. Other configurations of the fourth embodiment are the same as those of the third embodiment. Thus, in description and drawings of the second embodiment, the same numerals as the first embodiment or the same end numerals (last two digits) are added to the same member, and the like as those of the third embodiment, and description of configuration, action, and the like is omitted as appropriate.

As shown in FIG. 6A, in the rotor 330 (the sleeve laminate S) of the fourth embodiment, the diameter enlarged portions 340 are provided in both end portions of the rotary axis direction of the sleeve 31. The cover tube 33 of the fourth embodiment is composed of the first cover tube 33a and the second cover tube 33b. The first cover tube 33a and the second cover tube 33b are obtained by dividing the cover tube 33 in a middle of the rotary axis direction into two, as similar to the second embodiment.

In the present embodiment, in a work of the cover tube 33 to the sleeve laminate S, as shown in FIG. 6A, any one end portion of the sleeve laminate S is placed on the work surface F. Then, the first cover tube 33a is inserted to the sleeve laminate S from the upper side of the sleeve laminate S, while pressure is applied by a press fitting device (not shown). Thereby, the diameter of the inserted first cover tube 33a is enlarged by the diameter enlarged portion 340 of the sleeve 31, and the first cover tube 33a is inserted to the outer circumferential surface of the upper half of the sleeve laminate S (the permanent magnet 32). The first cover tube 33a is mounted to the lower side portion of the sleeve laminate S by interference fit by the action of the contraction force in accordance with the interference.

Subsequently, the upper and lower directions of the sleeve laminate S are switched with each other, and the sleeve laminate S is placed on the work surface F so that the first cover tube 33a is in the lower side, as shown in FIG. 6B. Then, the second cover tube 33b is inserted to the sleeve laminate S from the upper side of the sleeve laminate S, while pressure is applied by the press fitting device. Thereby, the diameter of the inserted second cover tube 33b is enlarged by the diameter enlarged portion 340 of the sleeve 31, and the second cover tube 33b is inserted to the outer circumferential surface of the upper half of the sleeve laminate S. The second cover tube 33b is mounted to the lower side portion of the sleeve laminate S by interference fit by the action of the contraction force in accordance with the interference. In this way, in the rotor 330 of the fourth embodiment, the first cover tube 33a and the second cover tube 33b are sequentially mounted, and thereby, the cover tube 33 is integrated.

In the rotor 330 of the fourth embodiment, the cover tube 33 is divided into two. Thus, as similar to the second embodiment, the interference of the cover tube 33 is increased, and thereby, even when the resistance of when the cover tube 33 is inserted becomes large, failure that is deformation, or the like generated in the sleeve laminate S, due to the resistance of when the cover tube 33 is inserted, can be prevented. In the fourth embodiment, an example in which the cover tube 33 is divided into two is described. However, the cover tube 33 may be divided into three or more.

Fifth Embodiment

Figure 7A:
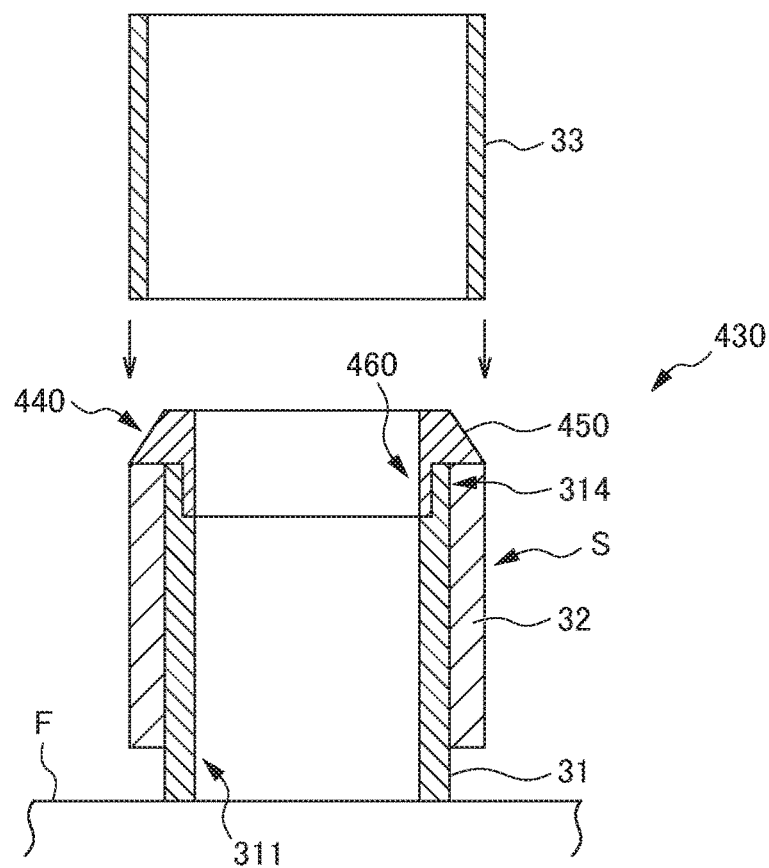
FIG. 7A is a diagram explaining a configuration and a manufacturing method of a rotor 430 of a fifth embodiment.
Figure 7B:
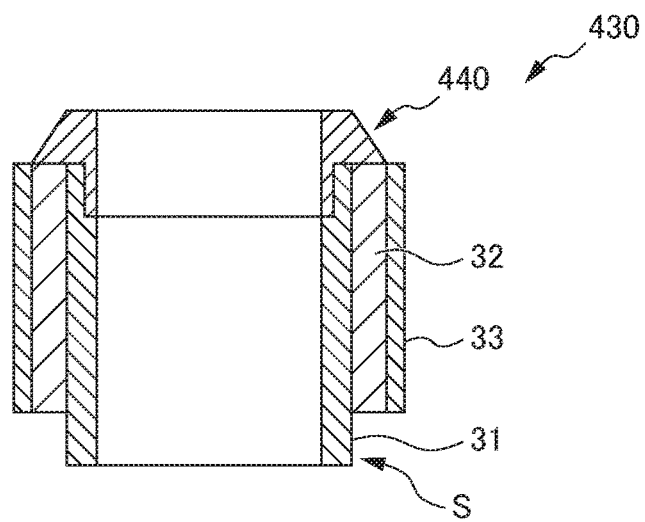
FIG. 7B is a diagram showing the rotor 430 of the fifth embodiment.

FIG. 7A is a diagram explaining a configuration and a manufacturing method of a rotor 430 of a fifth embodiment. FIG. 7B is a diagram showing the rotor 430 of the fifth embodiment. FIG. 7A and FIG. 7B show a cross section along the rotary axis line L (see FIG. 1 and FIG. 2) of the rotor 430.

The rotor 430 of the fifth embodiment is different from the third embodiment in a feature that the diameter enlarged portion is provided in the sleeve body. Other configurations of the fifth embodiment are the same as those of the third embodiment. Thus, in description and drawings of the fifth embodiment, the same numerals as the third embodiment or the same end numerals (last two digits) are added to the same member, and the like as those of the third embodiment, and description of configuration, action, and the like is omitted as appropriate.

As shown in FIG. 7(A), in the rotor 430 (the sleeve laminate S) of the fifth embodiment, the sleeve 31 includes a sleeve body (rotary member body) 311, and a diameter enlarged portion 440.

The sleeve body 311 is a substantially cylindrical member composing the sleeve 31, together with the diameter enlarged portion 440 described later. A concave portion 314 is provided in one end portion of the rotary axis direction of the sleeve body 311. The concave portion 314 has a concaved shape that can be fit to a convex portion 460 (described later) of the diameter enlarged portion 440. The convex portion 460 of the diameter enlarged portion 440 is joined to the concave portion 314 of the sleeve 31 by, for example, bonding, caulking, a screw, a mating structure, or the like.

The diameter enlarged portion 440 is a member formed in a substantially ring shape, and is provided in one end portion of the rotary axis direction of the sleeve body 311. The diameter enlarged portion 440 includes a diameter enlarged circumferential surface 450 and a convex portion 460. The diameter enlarged circumferential surface 450 is, for example, the same as the diameter enlarged circumferential surface 50 formed in the diameter enlarged portion 40 of the first embodiment, and is formed to be a tapered shape in which the diameter is enlarged from the first diameter region dt1 to the second diameter region dt2 in a certain inclination ratio (see FIG. 3A). The convex portion 460 is a portion having a convex shape that can be fit to the concave portion 314 provided in one end portion of the rotary axis direction of the sleeve 31, and is provided along the circumferential direction of the diameter enlarged portion 440. It is preferable that the diameter enlarged portion 440 is formed of the same material as that of the sleeve 31. The diameter enlarged portion 440 rotates as the sleeve 31 (part of the rotor 30) at the time of using of the rotor 30 (the motor 1).

In the present embodiment, in the work of mounting the cover tube 33 to the sleeve laminate S, as shown in FIG. 7A, an end portion of a side in which the concave portion 314 is not provided, in the sleeve laminate S is placed on the work surface F. Then, the concave portion of the sleeve laminate S and the convex portion 460 of the diameter enlarged portion 440

Then, the cover tube 33 is inserted to the sleeve laminate S from the side in which the diameter enlarged portion 440 is provided, while pressure is applied by the press fitting device (not shown). Thereby, the diameter of the inserted cover tube 33 is enlarged by the diameter enlarged portion 440 attached to the sleeve 31, and the cover tube 33 is inserted to the outer circumferential surface of the sleeve laminate S (the permanent magnet 32) as shown in FIG. 7B. The cover tube 33 inserted to the sleeve laminate S is mounted to the sleeve laminate S by interference fit by the action of the contraction force in accordance with the interference.

With the rotor 430 of the fifth embodiment, the diameter enlarged portion 140 is provided in the sleeve 31, and thereby, positional deviation of the permanent magnet 32 of when the cover tube 33 is inserted to the sleeve laminate S can be prevented. In addition, the diameter enlarged portions 440 having different shapes (the inclination ratio, or the like) of the diameter enlarged circumferential surface 450 can be attached to the same sleeve body 311 (the sleeve 31). Thus, diameter enlargement suitable for the interference of the cover tube 33 to be mounted can be performed. Further, as compared to the sleeve having the diameter enlarged portion integrally formed, the sleeve 31 in the rotor 430 of the fifth embodiment can be easily manufactured. The rotor 430 of the fifth embodiment may be configured so that the convex portion is provided in the diameter enlarged portion 440, and the sleeve laminate S is provided in the convex portion.

Six Embodiment

Figure 8A:
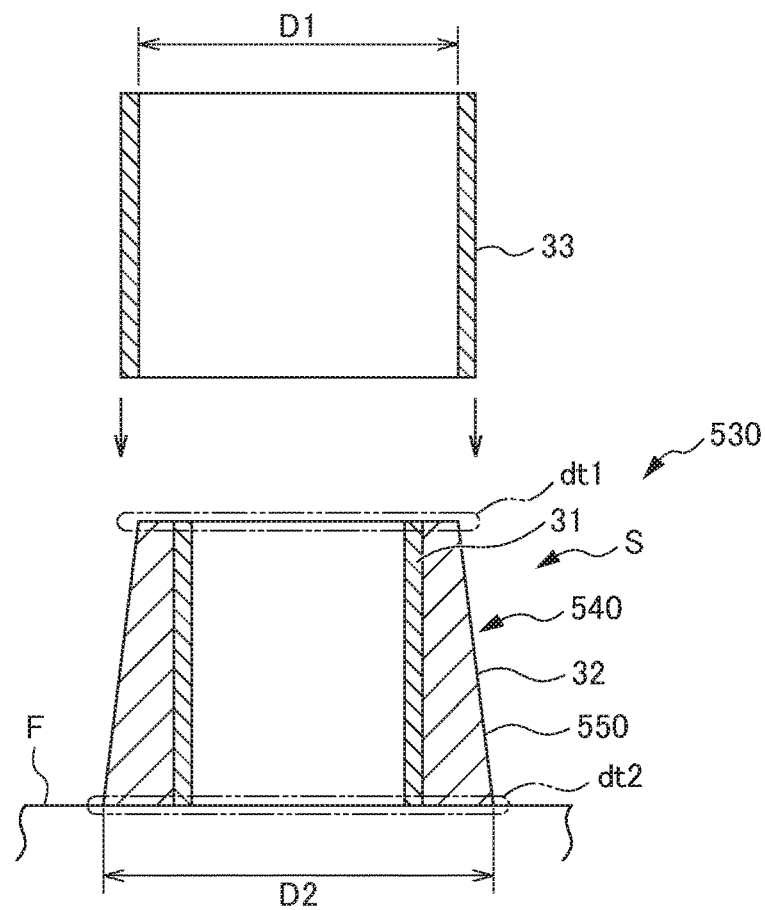
FIG. 8A is a diagram explaining a configuration and a manufacturing method of a rotor 530 of a sixth embodiment.
Figure 8B:
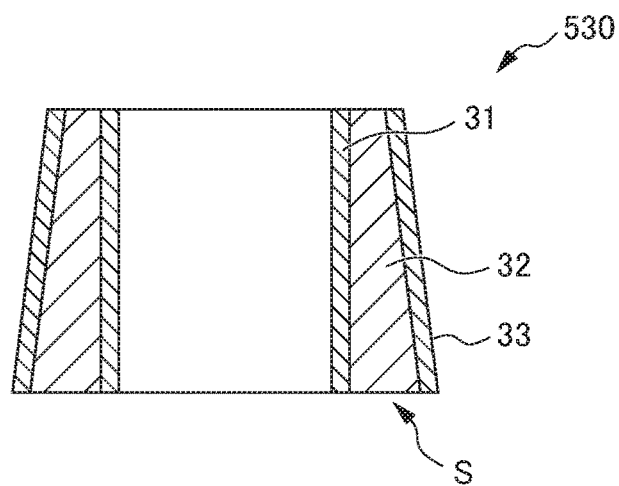
FIG. 8B is a diagram showing the rotor 530 of the sixth embodiment.

FIG. 8A is a diagram explaining a configuration and a manufacturing method of a rotor 530 of a sixth embodiment. FIG. 5B is a diagram showing the rotor 530 of the sixth embodiment. FIG. 8A and FIG. 8B show a cross section along the rotary axis line L (see FIG. 1 and FIG. 2) of the rotor 530.

The rotor 530 of the sixth embodiment is different from the first embodiment in the configuration of the diameter enlarged portion. Other configurations of the six embodiments are the same as those in the first embodiment. Thus, in description and drawings of the sixth embodiment, the same numerals as the first embodiment or the same end numerals (last two digits) are added to the same member, and the like as those of the first embodiment, and description of configuration, action, and the like is omitted as appropriate.

As shown in FIG. 8A, a diameter enlarged portion 540 that extends in the entire region of the rotary axis direction of the permanent magnet 32 is provided in the rotor 530 of the sixth embodiment. The diameter enlarged portion 540 has a diameter enlarged circumferential surface 550 in which the diameter is enlarged from the first diameter region dt1 that is the inner diameter D1 of the cover tube 33 or smaller, to the second diameter region dt2 that is the outer diameter D2 of the permanent magnet 32 or larger. The diameter enlarged portion 540 is provided along a circumferential direction of the permanent magnet 32.

In the present embodiment, in the work of mounting the cover tube 33 to the sleeve laminate S, as shown in FIG. 8A, an end portion of the second diameter region dt2 side of the diameter enlarged portion 540 is placed on the work surface F in the sleeve laminate S. Then, in the sleeve laminate S, the cover tube 33 is inserted to the sleeve laminate S from the first diameter region dt1 side of the diameter enlarged portion 540, while pressure is applied by the press fitting device (not shown). Thereby, the diameter of the inserted cover tube 33 is enlarged by the diameter enlarged portion 540 of the permanent magnet 32, and the cover tube 33 is inserted to the outer circumferential surface of the sleeve laminate S (the permanent magnet 32) as shown in FIG. 8B. The cover tube 33 inserted to the sleeve laminate S is mounted to the sleeve laminate S by interference fit by the action of the contraction force in accordance with the interference.

In the rotor 530 of the sixth embodiment, the diameter enlarged portion 540 has the diameter enlarged circumferential surface 550 formed along the entire region of the axial rotary axis direction of the permanent magnet 32. Thus, when the diameter of the cover tube 33 is enlarged to be the same diameter, the inclination ratio of the tapered portion can be gentler as compared to the diameter enlarged portion (for example, the diameter enlarged portion 40 of the first embodiment) having a short length of the rotary axis direction. An angle of contact between the cover tube 33 and the tapered portion, and an angle of a connection portion between the tapered portion and the permanent magnet 32 can be made larger. Thereby, the entire region of the rotary axis direction of the permanent magnet 32 is the diameter enlarged circumferential surface 550. Thus, the length of the rotary axis direction of the diameter enlarged portion 540 can be made shorter (or the diameter enlarged portion 540 can be eliminated). Further, the connection portion between the tapered portion and the permanent magnet 32 can be eliminated.

In this way, when the length of the diameter enlarged portion 540 becomes short, inertia of the rotor 530 becomes smaller. Thus, time until any rotation speed is reached can be reduced. In addition, the angle of contact between the cover tube 33 and the tapered portion is increased, and thereby, a bending of the cover tube 33 can be made smaller. Thereby, a compression stress due to the bending can be made smaller. Thus, a failure that is deformation, damage, or the like to the cover tube 33 can be prevented. In the rotor 530 of the sixth embodiment, the diameter enlarged circumferential surface 550 may be formed in the upper half region of the rotary axis direction of the permanent magnet 32, and the region of the lower half may have the same diameter.

Seventh Embodiment

Figure 9A:
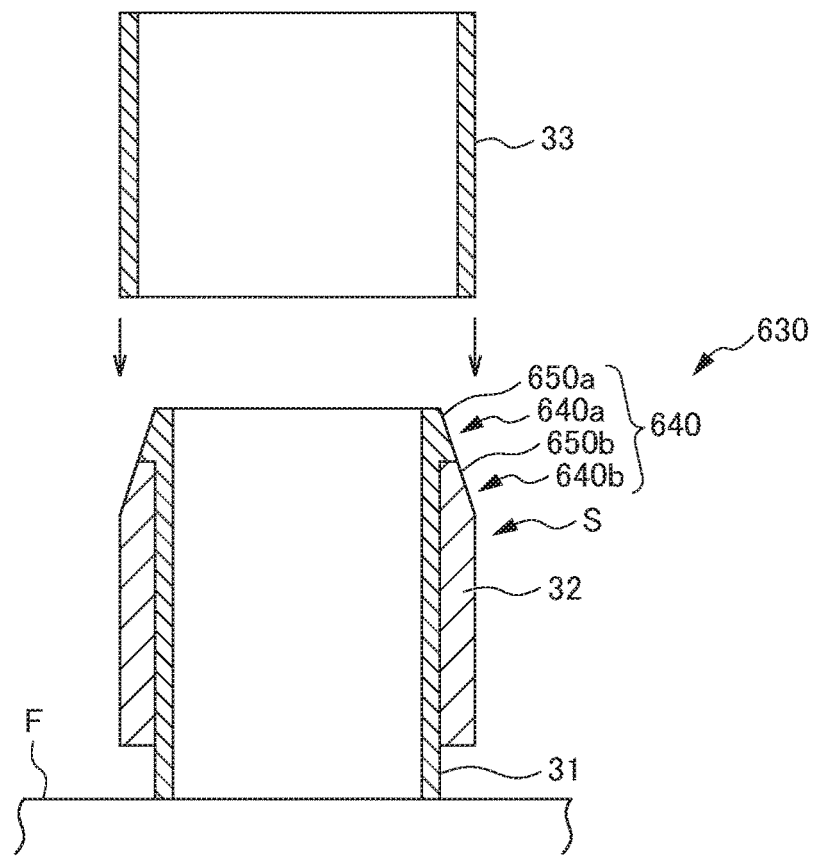
FIG. 9A is a diagram explaining a configuration and a manufacturing method of a rotor 630 of a seventh embodiment.
Figure 9B:
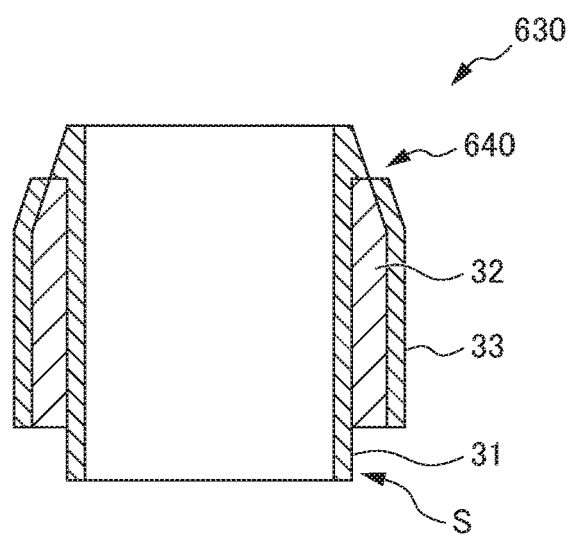
FIG. 9B is a diagram showing the rotor 630 of the seventh embodiment.

FIG. 9A is a diagram explaining a configuration and a manufacturing method of a rotor 630 of a seventh embodiment. FIG. 9B is a diagram showing the rotor 630 of the seventh embodiment. FIG. 9A and FIG. 9B show a cross section along the rotary axis line L (see FIG. 1 and FIG. 2) of the rotor 630.

The rotor 630 of the seventh embodiment is different from the first embodiment in a feature that the diameter enlarged portion is provided across both the sleeve and the permanent magnet. Other configurations of the seventh embodiment are the same as those of the first embodiment. Thus, in description and drawings of the seventh embodiment, the same numerals as the first embodiment or the same end numerals (last two digits) are added to the same member, and the like as those of the first embodiment, and description of configuration, action, and the like is omitted as appropriate.

As shown in FIG. 9A, in the rotor 630 (the sleeve laminate S), a first diameter enlarged portion 640*a* is provided in one end portion of the rotary axis direction or the sleeve 31. The configuration of the first diameter enlarged portion 640*a* is substantially the same as the diameter enlarged portion 240 (see FIG. 5A) of the third embodiment. The first diameter enlarged portion 640*a* has a diameter enlarged circumferential surface 650*b* as similar to the diameter enlarged portion 240 (the diameter enlarged circumferential surface 50) of the third embodiment. The first diameter enlarged portion 640*a* is provided along the circumferential direction in one end portion of the rotary axis direction of the sleeve 31.

In the rotor 630 of the seventh embodiment, a second diameter enlarged portion 640*b* is provided in one end (an end portion of the same side as the first diameter enlarged portion 640*a*) of the rotary axis direction of the permanent magnet 32. The second diameter enlarged portion 640*b* has a diameter enlarged circumferential surface 650*b* that is substantially flush with the diameter enlarged circumferential surface 650*a* of the first diameter enlarged portion 640*a* provided in the sleeve 31. The second diameter enlarged portion 640*b* is provided along the circumferential direction in one end portion of the rotary axis direction of the permanent magnet 32. The first diameter enlarged portion 640*a* and the second diameter enlarged portion 640*b* described above compose the diameter enlarged portion 640 in the present embodiment.

In the present embodiment, the work of mounting the cover tube 33 to the sleeve laminate S, as shown in FIG. 9A, in the sleeve laminate S, an end portion of a side in which the diameter enlarged portion 640 is not provided is provided on the work surface F. Then, in the sleeve laminate S, the cover tube 33 is inserted to the sleeve laminate S from the side in which the diameter enlarged portion 640 is provided, while pressure is applied by the press fitting device (not shown). Thereby, the diameter of the inserted cover tube 33 is enlarged by the diameter enlarged portion 640 (the first diameter enlarged portion 640*a* the second diameter enlarged portion 640*b*) of the sleeve 31, and the cover tube 33 is inserted to the outer circumferential surface of the sleeve laminate S (the permanent magnet 32) as shown in FIG. 9B. The cover tube 33 inserted to the sleeve laminate S is mounted to the sleeve laminate S by interference fit by the action of the contraction force in accordance with the interference.

With the rotor 630 of the present embodiment, since the diameter enlarged portion 640 is provided so as to be across the sleeve 31 and the permanent magnet 32, the inclination. ratio in of the tapered portion in the diameter enlarged portion 640 can be gentler. Thus, even when the interference of the cover tube 33 is made large, the cover tube 33 can be inserted to the sleeve laminate S more smoothly. The configuration of the present embodiment can be applied also to the first to fifth embodiments, and the like.

Next, an embodiment in which a cover tube is mounted to a sleeve laminate including a diameter enlarged portion, will be described.

Eighth Embodiment

Figure 10A:
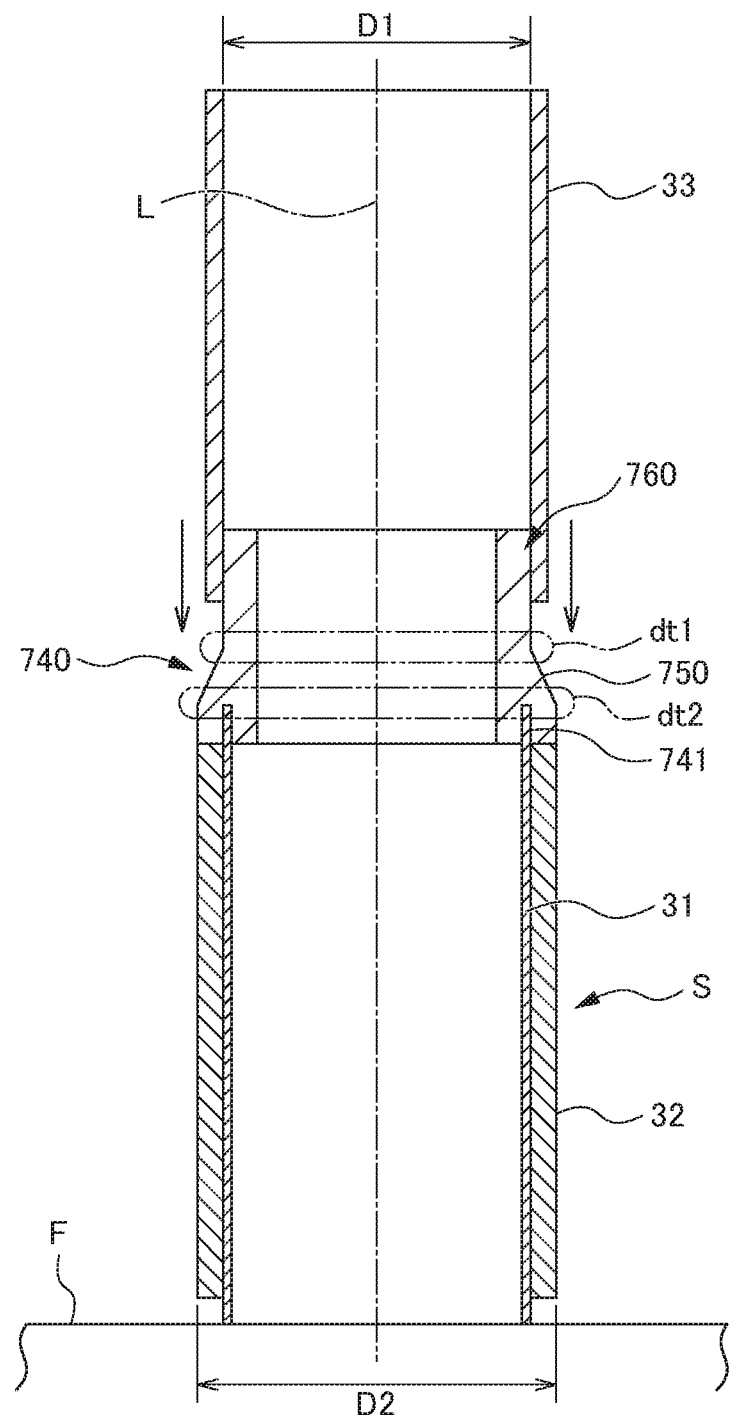
FIG. 10A is a diagram explaining a configuration and a manufacturing method of a rotor 730 of an eighth embodiment.

FIG. 10A and FIG. 10B are diagrams explaining a configuration and a manufacturing method of a rotor 730 of the eighth embodiment. In description and drawings of the eighth embodiment, the same numerals as the first embodiment or the same end numerals (last two digits) are added to the same member, and the like as those of the first embodiment, and description of configuration, action, and the like is omitted as appropriate.

As shown in FIG. 10A, in the sleeve laminate S of the eighth embodiment, both end portions of the rotary axis direction of the sleeve 31 project from the permanent magnet 32. In the present embodiment, part of the sleeve 31 projecting from the permanent magnet 32 functions as a matching portion (positioning portion) that matches rotary axis lines (rotary centers) L of the diameter enlarged portion 740 and the sleeve 31. The sleeve 31 of the eighth embodiment includes the diameter enlarged portion 74 in one end portion of the rotary axis direction.

The diameter enlarged portion 740 is a member formed to be a substantially cylindrical shape. The diameter enlarged portion 740 includes a diameter enlarged circumferential surface 750, and a tube fitting portion 760. The diameter enlarged circumferential surface 750 is formed to be a tapered shape in which the diameter of the diameter enlarged circumferential surface 750 is enlarged in a certain inclination ratio, from the first diameter region dt1 that is the inner diameter D1 of the cover tube 33 or smaller, to the second diameter region dt2 that is the outer diameter D2 of the permanent magnet 32 or larger. The diameter enlarged circumferential surface 750 is provided along the circumferential direction of the diameter enlarged portion 740. In the diameter enlarged portion 740, a concave portion 741 is provided in an end surface of the second diameter region dt2 side. The concave portion 741 is an annular groove formed so as to be able to fit with the sleeve 31 (the matching portion) projecting from the sleeve laminate S. The concave portion 741 functions as the matching portion (positioning portion) that matches the rotary axis lines (rotary centers) L of the diameter enlarged portion 740 and the sleeve 31. The concave portion 741 is formed along the circumferential direction of the diameter enlarged portion 740 so as to fit with the sleeve 31 projecting from the sleeve laminate S.

The tube fitting portion 760 is a portion to which the cover tube 33 is fit. The tube fitting portion 760 has an outer diameter that can be fit to the inner diameter D1 of the cover tube 33, and is formed to be a cylindrical shape. The cover tube 33 fit to the tube fitting portion 760 can be slid in an upper and lower direction. The diameter enlarged portion 740 is, for example, formed of a non-magnetic material (including a resin) such as an austenitic stainless steel.

In the present embodiment, when the cover tube 33 is mounted to the sleeve laminate S, first, as shown in FIG. 10A, an opposite end portion from the side in which the diameter enlarged portion 740 is provided is placed on the work surface F in the sleeve laminate S.

Next, the cover tube 33 is fit to the tube fitting portion 760 of the diameter enlarged portion 740. Then, the cover tube 33 fit to the tube fitting portion 760 is inserted to the sleeve laminate S, while pressure is applied by the press fitting device (not shown). Thereby, the diameter of the cover tube 33 is enlarged by the diameter enlarged portion 740 (the diameter enlarged circumferential surface 750), and the cover tube 33 is inserted to the outer circumferential surface of the sleeve laminate S (the permanent magnet 32) as shown in FIG. 10B. The cover tube 33 inserted to the sleeve laminate S is mounted to the sleeve laminate S by interference fit, by the action or the contraction force in accordance with the interference. Thereby, the rotor 730 in which the cover tube 33 is mounted to the outer circumference of the permanent magnet 32 is obtained.

With the rotor 730 of the eighth embodiment, the cover tube 33 can be mounted to the permanent magnet 32 disposed on the outer circumference of the sleeve 31, with larger interference. Thereby, the permanent magnet 32 can be held with larger reaction force, resisting the centrifugal force generated at the time of rotating. Thus, falling off of the permanent magnet 32 due to the centrifugal force can be effectively prevented.

With the rotor 730 of the eighth embodiment, the rotary axis lines L of the diameter enlarged portion 740 and the sleeve 31 can be matched by fitting the concave portion 741 of the diameter enlarged portion 740 to part of the sleeve 31 (the sleeve laminate S) projecting from the permanent magnet 32. Positioning deviation of the cover tube 33 can be prevented during the insertion of the cover tube 33 to the sleeve laminate S, by fitting the diameter enlarged portion 740 to the sleeve 31. With the rotor 730 according to the eighth embodiment, since there is no need to form a tapered-shape diameter enlarged portion in the sleeve 31 and the permanent magnet 32, machining time of the sleeve laminate S can be reduced.

Ninth Embodiment

Figure 11A:
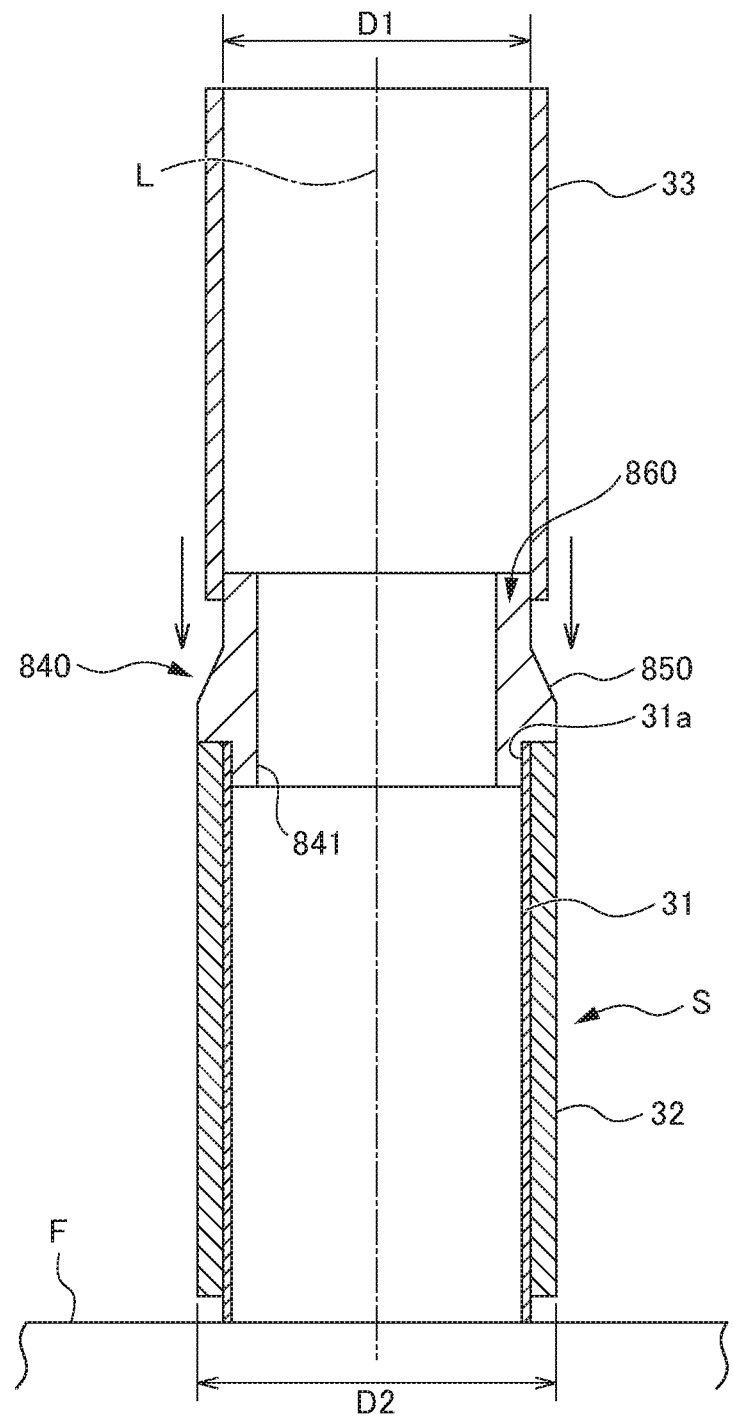
FIG. 11A is a diagram explaining a configuration and a manufacturing method of a rotor 830 of a ninth embodiment.
Figure 11B:
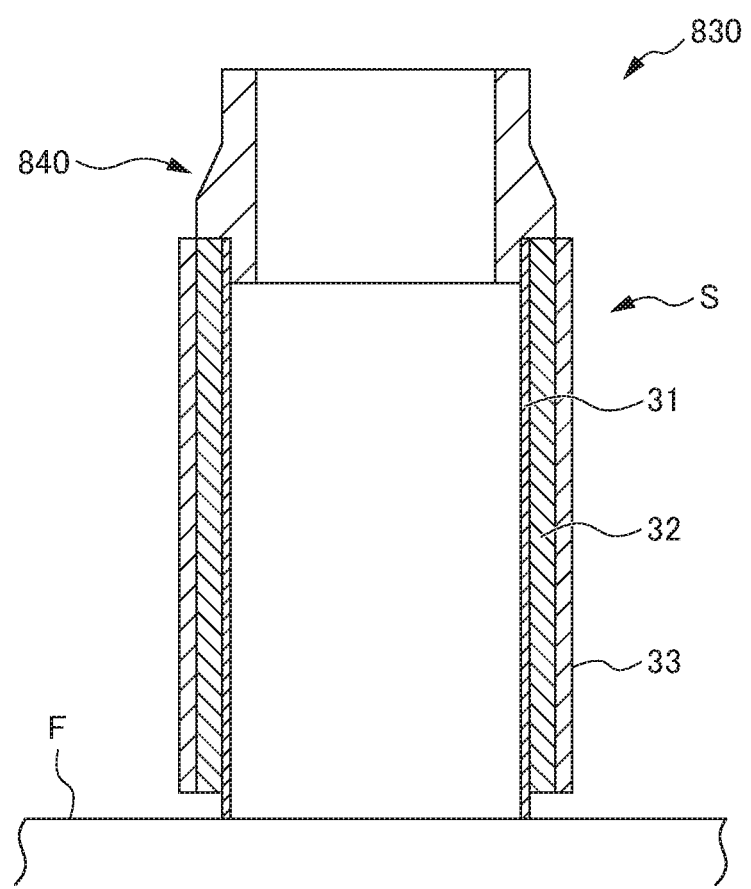
FIG. 11B is a diagram explaining the configuration and the manufacturing method of the rotor 830 of the ninth embodiment.

FIG. 11A and FIG. 11B are diagrams explaining a configuration and a manufacturing method of a rotor 830 of a ninth embodiment. In description and drawings of the ninth embodiment, the same numerals as the eighth embodiment or the same end numerals (last two digits) are added to the same member, and the like as those of the eighth embodiment, and description of configuration, action, and the like is omitted as appropriate.

As shown in FIG. 11A, in the sleeve laminate S of the ninth embodiment, one end portion (or both end portions) of the rotary axis direction of the sleeve 31 is formed to be the same surface as the permanent magnet 32. Such configuration is used when, for example, the length of the rotary axis direction of the rotor is made short, and the entire rotor is made to be a more compact shape. In the sleeve 31 of the ninth embodiment, one end portion 31a of an inner circumferential surface functions as a matching portion (positioning portion) that matches rotary axis lines (rotary centers) L of a diameter enlarged portion 840 and the sleeve 31. The sleeve 31 of the ninth embodiment includes the diameter enlarged portion 84 in one end portion of the rotary axis direction.

The diameter enlarged portion 840 is a member formed to be a substantially cylindrical shape. The diameter enlarged portion 840 includes a diameter enlarged circumferential surface 850 and a tube fitting portion 860. The diameter enlarged circumferential surface 850 is formed to be a tapered shape in which the diameter of the diameter enlarged circumferential surface 850 is enlarged in a certain inclination ratio, from the first diameter region dt1 that is the inner diameter D1 of the cover tube 33 or smaller, to the second diameter region dt2 that is the outer diameter D2 of the permanent magnet 32 or larger, as similar to the diameter enlarged portion 740 (see FIG. 10A) of the eighth embodiment described above. The diameter enlarged circumferential surface 850 is provided along the circumferential direction of the diameter enlarged portion 840. A convex portion 841 is provided in an opposite end surface from the tube fitting portion 860 in the diameter enlarged portion 840. The convex portion 841 is a columnar projection formed so as to be fit with an end portion of the rotary axis direction of the sleeve laminate S. The convex portion 841 functions as a matching portion (positioning portion) that matches rotary axis lines (rotary centers) L of the diameter enlarged portion 840 and the sleeve 31.

The tube fitting portion 860 is a portion to which the cover tube 33 is fit. The tube fitting portion 860 has an outer diameter that can be fit to the inner diameter D1 of the cover tube 33, and is formed to be a cylindrical shape. The cover tube 33 fit to the tube fitting portion 860 can be slid in an upper and lower direction. Since materials, structure, and the like composing the diameter enlarged portion 840 of the present embodiment is the same as those of the diameter enlarged portion 740 of the eighth embodiment, description thereof is omitted.

In the present embodiment, when the cover tube 33 is mounted to the sleeve laminate S, first, as shown in FIG. 11A, an opposite end portion from the side in which the diameter enlarged portion 840 is provided is placed on the work surface F in the sleeve laminate S.

Next, the cover tube 33 is fit to the tube fitting portion 860 of the diameter enlarged portion 840. Then, the cover tube 33 fit to the tube fitting portion 860 is inserted to the sleeve laminate S, while pressure is applied by the press fitting device (not shown). Thereby, the diameter of the cover tube 33 is enlarged by the diameter enlarged portion 840 (the diameter enlarged circumferential surface 850), and the cover tube 33 is inserted to the outer circumferential surface of the sleeve laminate S (the permanent magnet 32) as shown in FIG. 11B. The cover tube 33 inserted to the sleeve laminate S is mounted to the sleeve laminate S by interference fit by the action of the contraction force in accordance with the interference.

Thereby, the rotor 830 in which the cover tube 33 is mounted to the outer circumference of the permanent magnet 32 is obtained. Similar effect to that in the eighth embodiment described above can be obtained also in the rotor 830 according to the ninth embodiment. In the ninth embodiment, the entire region of the rotary axis direction of the sleeve 31 may have a hollow structure, or an end portion side of the rotary axis direction may have a hollow structure, and other portions may have a columnar shape.

Tenth Embodiment

Figure 12A:
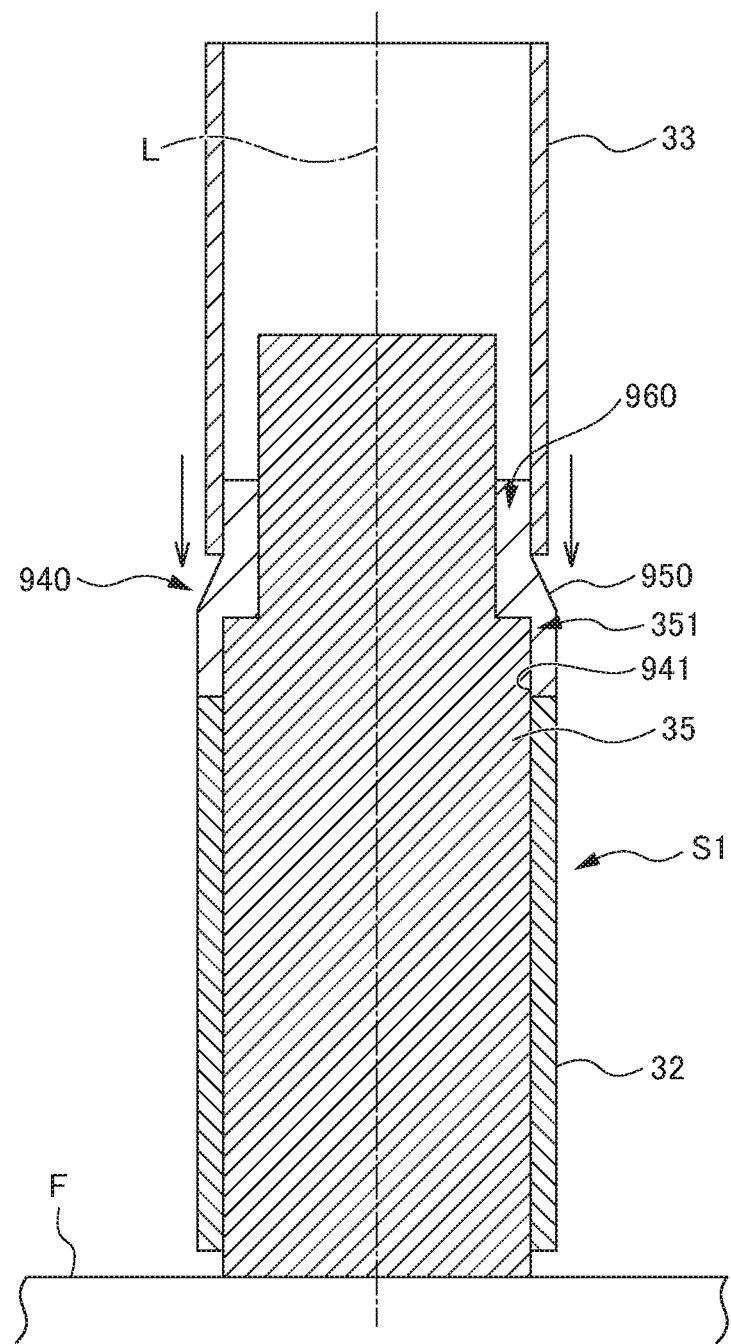
FIG. 12A is a diagram explaining a configuration and a manufacturing method of a rotor 930 of a tenth embodiment.
Figure 12B:
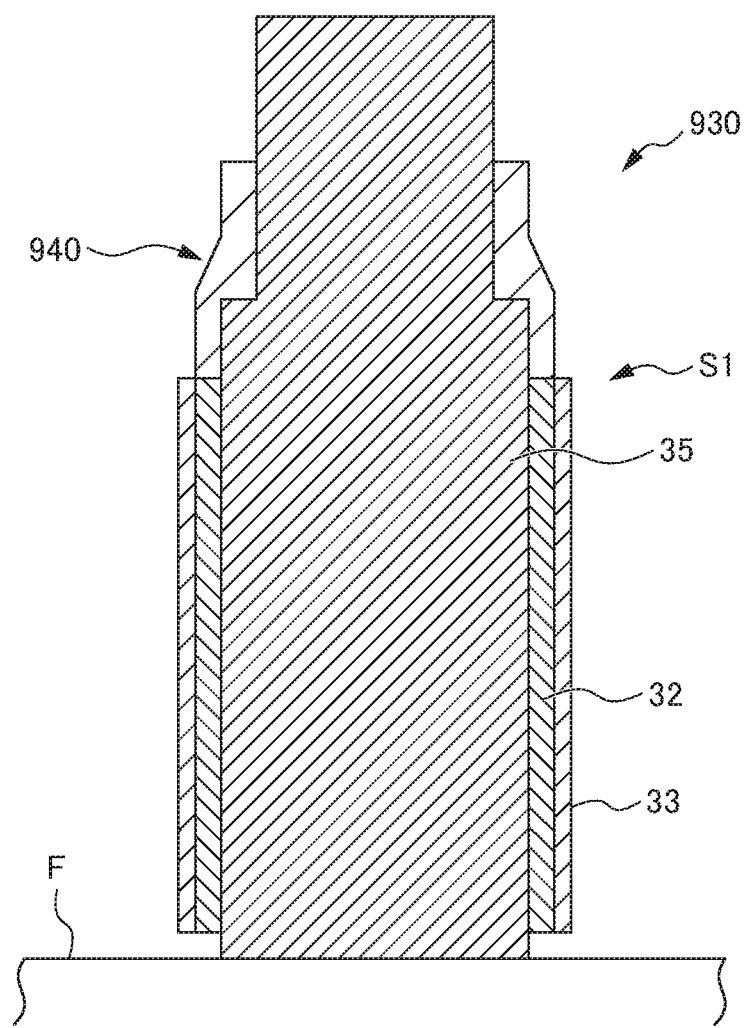
FIG. 12B is a diagram explaining the configuration and the manufacturing method of the rotor 930 of the tenth embodiment.

FIG. 12A and FIG. 12B are diagrams explaining a configuration and a manufacturing method of a rotor 930 of a tenth embodiment. In description and drawings of the tenth embodiment, the same numerals as the first embodiment or the same end numerals (last two digits) are added to the same member, and the like as those of the first embodiment, and description of configuration, action, and the like is omitted as appropriate.

As shown in FIG. 12A, the plurality of permanent magnets 32 are adhered to the rotary axis 35 of the tenth embodiment not via the sleeve in the outer circumference. In the description below, the rotary axis 35 to which the plurality or permanent magnets 32 are adhered is also collectively referred to as a "rotary axis laminate S1". The rotary axis 35 (rotation member) of the tenth embodiment includes the diameter enlarged portion 940 in one end portion of the rotary axis direction.

The diameter enlarged portion 940 is a member formed to be a substantially cylindrical shape. The diameter enlarged portion 940 includes a diameter enlarged circumferential surface 950 and a tube fitting portion 960. The diameter enlarged circumferential surface 950 is formed to be a tapered shape in which the diameter of the diameter enlarged circumferential surface 930 is enlarged in a certain inclination ratio, from the first diameter region dt1 that is the inner diameter D1 of the cover tube 33 or smaller, to the second diameter region dt2 that is the outer diameter D2 of the permanent magnet 32 or larger, as similar to the diameter enlarged portion 740 (see FIG. 10A) of the eighth embodiment described above. The diameter enlarged circumferential surface 950 is provided along the circumferential direction of the diameter enlarged portion 940. A concave portion 941 is provided in the diameter enlarged portion 940. The concave portion 941 is a substantially cylindrical recess formed so as to fit with a convex portion 351 (described later) of the rotary axis 35. The concave portion 941 functions as a matching portion (positioning portion) that matches rotary axis lines (rotary centers) L of the diameter enlarged portion 940 and the rotary axis 35.

The tube fitting portion 960 is a portion to which the cover tube 33 is fit. The tube fitting portion 960 has an outer diameter that can be fit to the inner diameter D1 of the cover tube 33, and is formed to be a cylindrical shape. The cover tube 33 fit to the tube fitting portion 960 can be slid in an upper and lower direction. Since materials, structure, and the like composing the diameter enlarged portion 940 of the present embodiment is the same as those of the diameter enlarged portion 740 of the eighth embodiment, description thereof is omitted.

The rotary axis 35 includes a convex portion 351 in one side of the rotary axis direction. The convex portion 351 is a portion formed so as to fit with a concave portion 941 of the diameter enlarged portion 940. The convex portion 351 functions as a matching portion (positioning portion) that matches rotary axis lines (rotary centers) L of the diameter enlarged portion 940 and the rotary axis 35.

In the present embodiment, when the cover tube 33 is mounted to the sleeve laminate S, first, as shown in FIG. 12A, an opposite end portion from the side in which the diameter enlarged portion 940 is provided is placed on the work surface F in the sleeve laminate S.

Next, the cover tube 33 is fit to the tube fitting portion 960 of the diameter enlarged portion 940. Then, the cover tube 33 inserted to the tube fitting portion 960 is inserted to the rotary axis laminate S1, while pressure is applied by the press fitting device (not shown). Thereby, the diameter of the inserted cover tube 33 is enlarged by the diameter enlarged portion 940 (the diameter enlarged circumferential surface 950), and the cover tube 33 is inserted to the outer circumferential surface of the rotary axis laminate S1 (the permanent magnet 32) as shown in FIG. 12B. The cover tube 33 inserted to the rotary axis laminate S1 is mounted to the rotary axis laminate S1 by interference fit by the action of the contraction force in accordance with the interference.

Thereby, the rotor 930 in which the cover tube 33 is mounted to the outer circumference of the permanent magnet 32 is obtained. Similar effect to that in the eighth embodiment described above can be obtained also in the rotor 930 according to the tenth embodiment.

The rotor and the manufacturing method of the rotor according to the present invention further exhibits effects below in addition to the effects described in each embodiment. In the rotor and the manufacturing method of the rotor according to the present invention, mounting of the cover tube to the sleeve laminate or the rotary axis laminate can be performed under a normal temperature. Thus, a facility for managing temperature is not necessary, and a facility cost can be reduced. In the rotor and the manufacturing method of the rotor according to the present invention, mounting of the cover tube to the sleeve laminate or the rotary axis laminate can be performed under a normal temperature. Thus, quality of the cover tube formed of a reinforcement plastic such as the CFRP can be prevented from degrading as compared to when a manufacturing step includes a cooling step or a heating step.

In the rotor and the manufacturing method of the rotor according to the present invention, the cover tube is inserted to the sleeve laminate while the diameter of the cover tube is gradually enlarged by the diameter enlarged portion. Thus, the cover tube formed of a fiber reinforced plastic such as the CFRP is hard to be chipped by a corner portion of the permanent magnet, as general press fitting. Thereby, cutting of a fiber forming the cover tube and cracking of a resin are hard to be generated. Thus, quality and strength of the cover tube can be prevented from decreasing. In addition, since cutting of a fiber forming the cover tube and cracking of a resin are hard to be generated, the interference can be maintained almost uniformly along the rotary axis direction of the cover tube.

When the cover tube is mounted to the sleeve laminate or the rotary axis laminate, if a shaved fiber or resin is mixed to between the cover tube and the permanent magnet, the cover tube partly becomes a convex shape, stress concentrates on the part at the time of rotating, and the strength of the cover tube is decreased. In the rotor and the manufacturing method of the rotor according to the present invention, shaved fiber or resin is hard to be mixed in between the cover tube and the permanent magnet. Thus, the strength of the cover tube can be prevented from decreasing.

In the rotor and the manufacturing method of the rotor according to the present invention, the cover tube is inserted to the sleeve laminate while the diameter of the cover tube is gradually enlarged. Thus, a force of when the cover tube is press fit can be made smaller, for example, as compared to when press fitting is performed so that the cover tube passes over the corner portion of the permanent magnet. Thus, deformation and damage of the cover tube due to pressure in press fitting can be prevented.

In general press fitting by freeze fitting, or the like, when there is variability in the outer diameters of the permanent magnets disposed in the sleeve, the cover tube may be locally shaved largely. On the other hand, according to the rotor and the manufacturing method of the rotor according to the present invention, even when there is variability in the outer diameters of the permanent, magnets, the cover tube is not locally shaved. Thus, the quality and strength of the cover tube can be prevented from decreasing. Such effect is exhibited also when, for example, the outer shape of the rotor is made to be a substantially polygon as a measure to cogging.

In the rotor and the manufacturing method of the rotor according to the present invention, an adhesion step of the permanent magnet to the outer circumference of the sleeve, and a manufacturing step of the cover tube can be advanced concurrently. Thus, assembly time of the rotor can be reduced as compared to when the cover tube is formed by winding the fiber in the outer circumference of the permanent magnet after the permanent magnet is adhered to the outer circumference of the sleeve. In the rotor and the manufacturing method of the rotor according to the present invention, a step of making the member to have a lower temperature such as freeze fitting is not necessary. Thus, the assembly time of the rotor can be reduced.

In the rotor and the manufacturing method of the rotor according to the present invention, the position of the cover tube to be mounted to the sleeve laminate can be adjusted as appropriate by changing the position and the shape of the diameter enlarged portion with respect to the rotary axis direction of the rotor. Thereby, an area of the permanent magnet covered by the cover tube can be increased. Thus, falling off (scattering) of the permanent magnet from the rotor can be prevented more effectively.

The embodiments of the present invention are described above. The present invention is not limited to the embodiments described above, and can be performed with various modifications and changes as a modification described later, and those are included in a technical scope of the present invention. The effects described in the embodiments are only listing of the most preferable effects generated by the present invention, and the effects are not limited to those described in the embodiments. The embodiments described above and the modification described later may be used in combination as appropriate. However, detailed description thereof is omitted.

Modification

In the eighth to tenth embodiments, the rotor including the diameter enlarged portion in the sleeve or the rotary axis is described. However, the rotor is not limited thereto. The diameter enlarged portion may be detached from the sleeve or the rotary axis after the cover tube is mounted to the rotor. In each embodiment, an example in which the diameter enlarged circumferential surface of the diameter enlarged portion made tapered shape. However, the diameter enlarged circumferential surface riot limited thereto. For example, the diameter enlarged circumferential surface may be a curve shape such as an R shape. The diameter enlarged circumferential surface of the diameter enlarged portion may be, for example, a combination shape of the tapered shape and the curve shape.

EXPLANATION OF REFERENCE NUMERALS

1: Motor, 20: Stator, 30, 130, 230, 330, 430, 530, 630, 730, 830, 930: Rotor, 31: Sleeve, 32: Permanent magnet, 33: Cover tube, 35: Rotary axis, 40, 140, 240, 340, 440, 540, 610, 740, 840, 940: Diameter enlarged portion, 50, 450, 550, 650, 750, 850, 950: Diameter enlarged circumferential surface, 760, 860, 960: Tube fitting portion, 311: Sleeve body, dt1: First diameter region, dt2: Second diameter region

What is claimed is:

1. A rotor comprising:
a rotary member;
a plurality of permanent magnets disposed on an outer circumference of the rotary member; and
a cover tube that is mounted to outer circumference of the permanent magnets to cover the permanent magnets, and is formed of a fiber reinforced plastic, wherein at least the rotary member of the rotary member and the permanent magnets has a diameter enlarged portion having a diameter enlarged circumferential surface such that the cover tube is increased in diameter as the cover tube is inserted,
the diameter enlarged portion has a diameter that enlarges from a first diameter region to a second diameter region,
the first diameter region has a diameter equal to or less than an inner diameter of the cover tube, and
the second diameter region has a diameter equal to or more than an outer diameter of the permanent magnets.

2. The rotor according to claim 1, wherein the diameter enlarged portion is provided in an at least one end portion in a rotary axis direction.

3. The rotor according to claim 1, wherein the diameter enlarged portion is provided in both end portions in the rotary axis direction, and
the cover tube is divided along the rotary axis direction.

4. The rotor according to claim 1, wherein the diameter enlarged portion is configured to be coupled with an end portion of the rotary member.

5. The rotor according to claim 4, wherein the diameter enlarged portion and the rotary member include matching portions that match rotary centers of the diameter enlarged portion and the rotary member.

6. The rotor according to claim 1, wherein the diameter enlarged circumferential surface of the diameter enlarged portion is formed to be a tapered shape or a curved shape.

7. A rotary electric machine comprising:
the rotor according to claim 1;
a rotary axis that supports the rotor; and
a stator provided in an outer circumference of the rotor.

8. A manufacturing method for manufacturing a rotor including a rotary member, a plurality of permanent magnets disposed on an outer circumference of the rotary member, and a cover tube formed of a fiber reinforced plastic, wherein
at least the rotary member of the rotary member and the permanent magnets has a diameter enlarged portion having a diameter enlarged circumferential surface such that the cover tube is increased in diameter as the cover tube is inserted,
the diameter enlarged portion has a diameter that enlarges from a first diameter region to a second diameter region,
the first diameter region has a diameter equal to or less than an inner diameter of the cover tube, and
the second diameter region has a diameter equal to or more than an outer diameter of the permanent magnets,
the manufacturing method comprises:
putting the cover tube around the outer circumference of the permanent magnets by pushing the cover tube from the first diameter region to enlarge the inner diameter of the cover tube by the second diameter region of the diameter enlarged portion.

* * * * *